United States Patent [19]

Kumarappan

[11] Patent Number: 5,287,202
[45] Date of Patent: Feb. 15, 1994

[54] METHOD AND APPARATUS FOR A FACSIMILE MACHINE HAVING ASCII CODE ADDRESSING CAPABILITY

[75] Inventor: Kumar N. Kumarappan, Fremont County, Calif.

[73] Assignees: Ricoh Co., Ltd., Tokyo, Japan; Ricoh Corporation, San Jose, Calif.

[21] Appl. No.: 903,232

[22] Filed: Jun. 23, 1992

[51] Int. Cl.⁵ ............................................. H04N 1/40
[52] U.S. Cl. .................. 358/440; 358/403; 358/434; 358/400; 379/100
[58] Field of Search ............... 358/400, 401, 403, 404, 358/405, 406, 407, 434, 435, 436, 438, 439, 440, 441, 442; 379/100

[56] References Cited

U.S. PATENT DOCUMENTS

| | | | |
|---|---|---|---|
| 4,367,533 | 1/1983 | Wiener | 340/731 |
| 4,743,747 | 5/1988 | Fougere et al. | 380/51 |
| 4,829,559 | 5/1989 | Izawa et al. | 379/100 |
| 4,961,185 | 10/1990 | Sawada | 358/442 |
| 4,974,097 | 11/1990 | Kaneko et al. | 358/400 |
| 5,041,915 | 8/1991 | Hirota et al. | 358/434 |
| 5,091,931 | 2/1992 | Milewski | 379/100 |

Primary Examiner—Edward L. Coles, Sr.
Assistant Examiner—Jerome Grant, II
Attorney, Agent, or Firm—Flehr, Hohbach, Test, Albritton & Herbert

[57] ABSTRACT

A facsimile machine is provided which includes a mechanism to generate ASCII codes for addressing a digital network, and to generate numeric number for addressing the public switched telephone (analog) network. Such facsimile machine can address other facsimile machines and communicate data over either network, in digital or analog format.

33 Claims, 16 Drawing Sheets (PRIOR ART)
FIG. —3

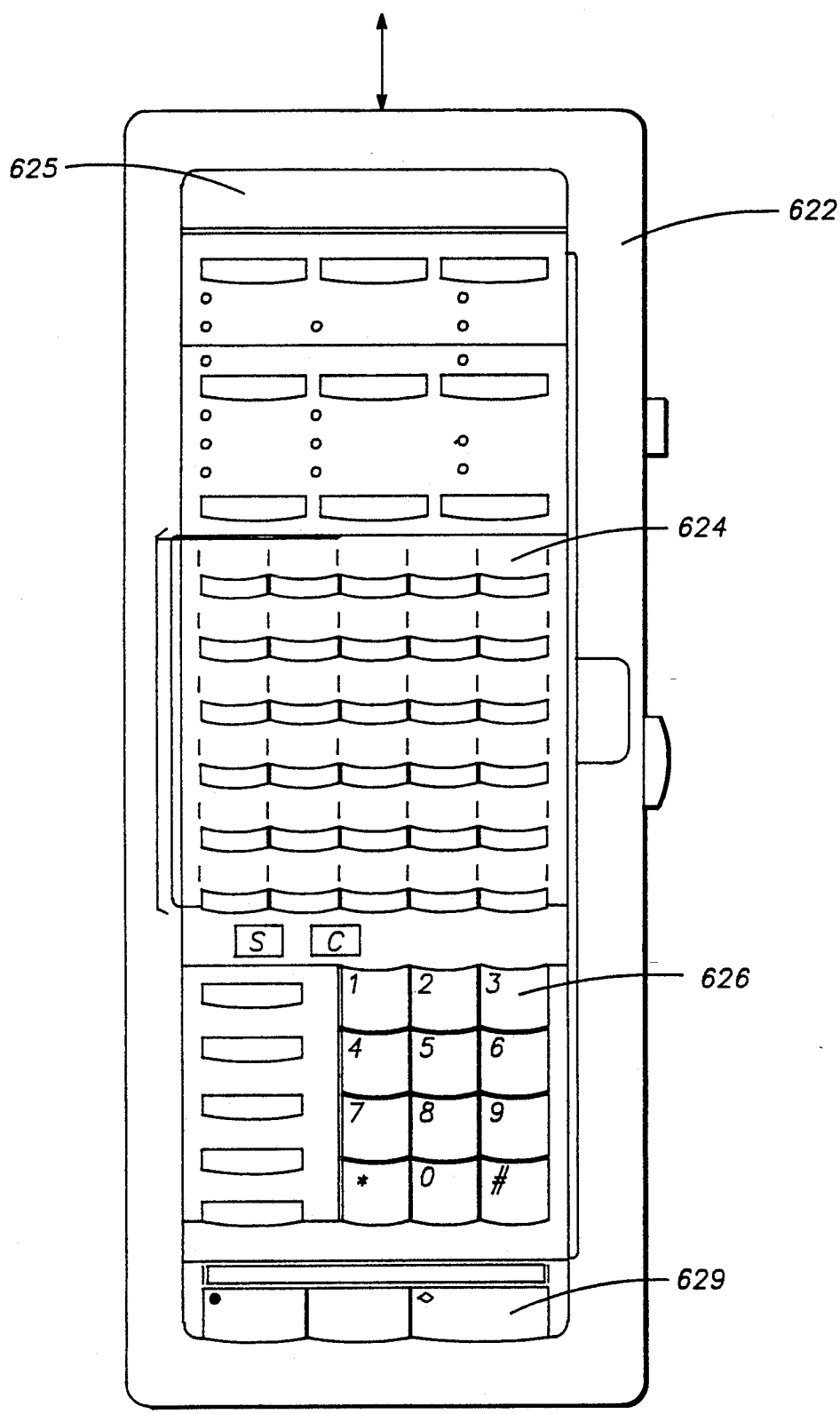
FIG.—6B

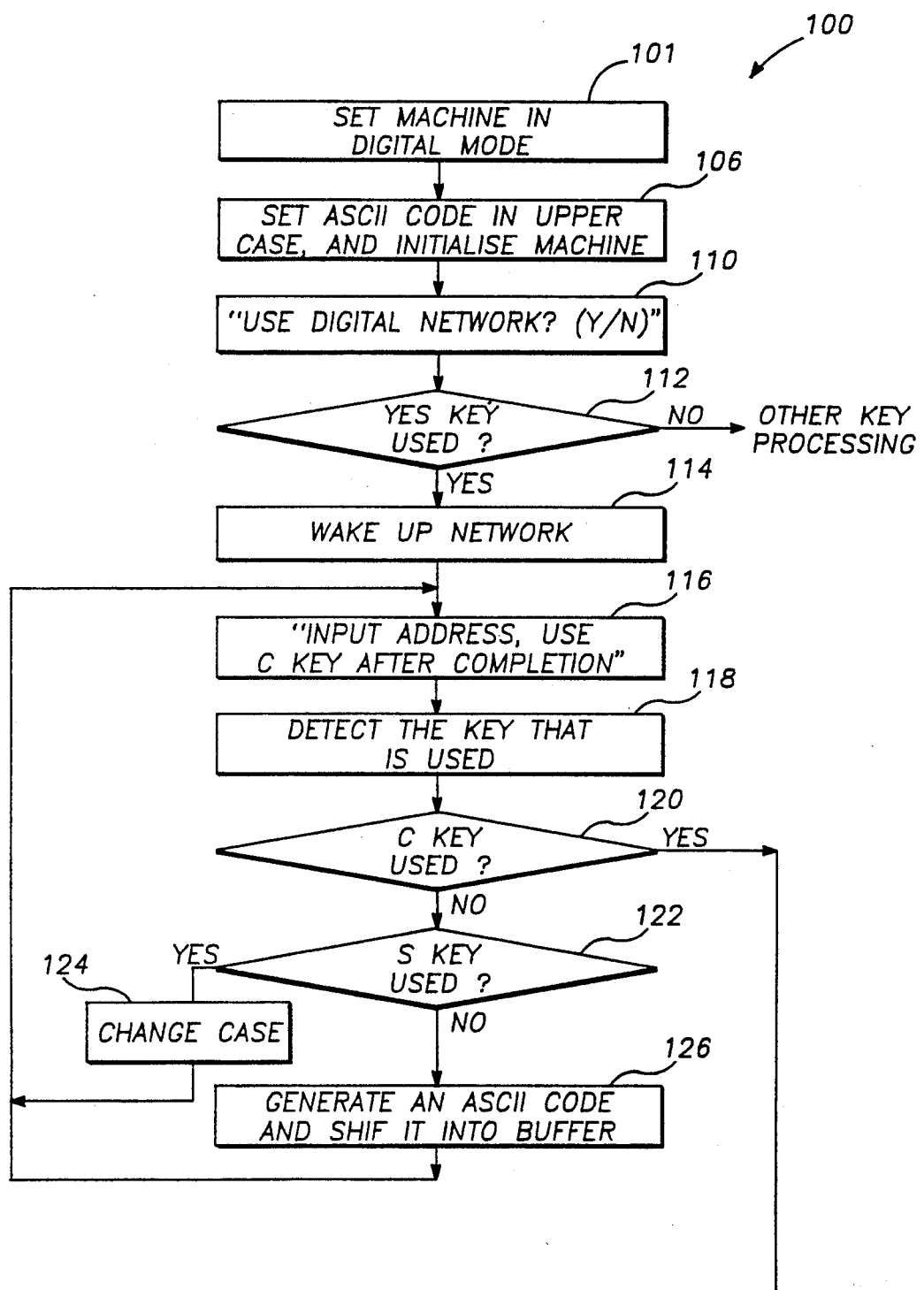
FIG.—7A

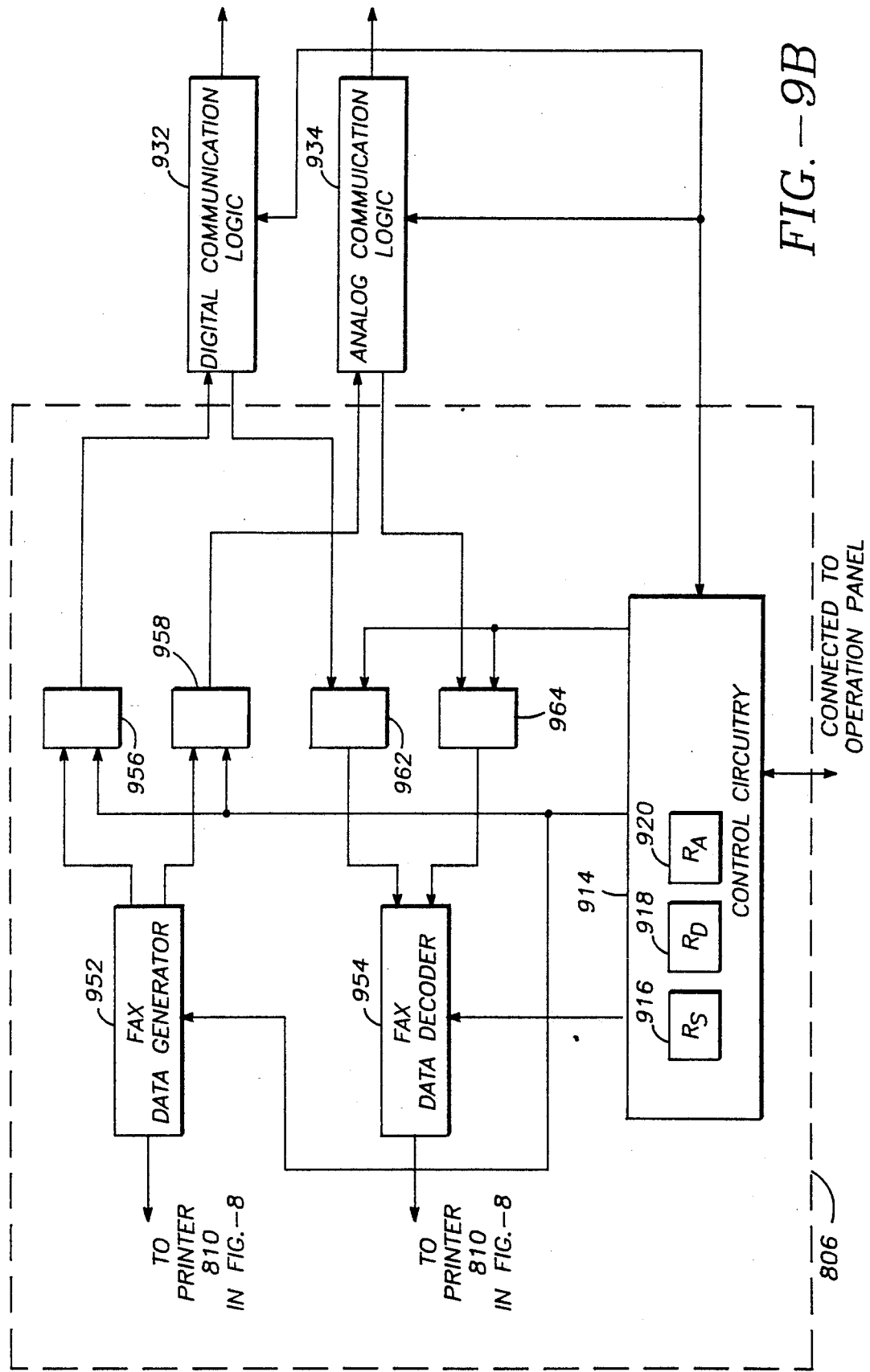
FIG.—9B

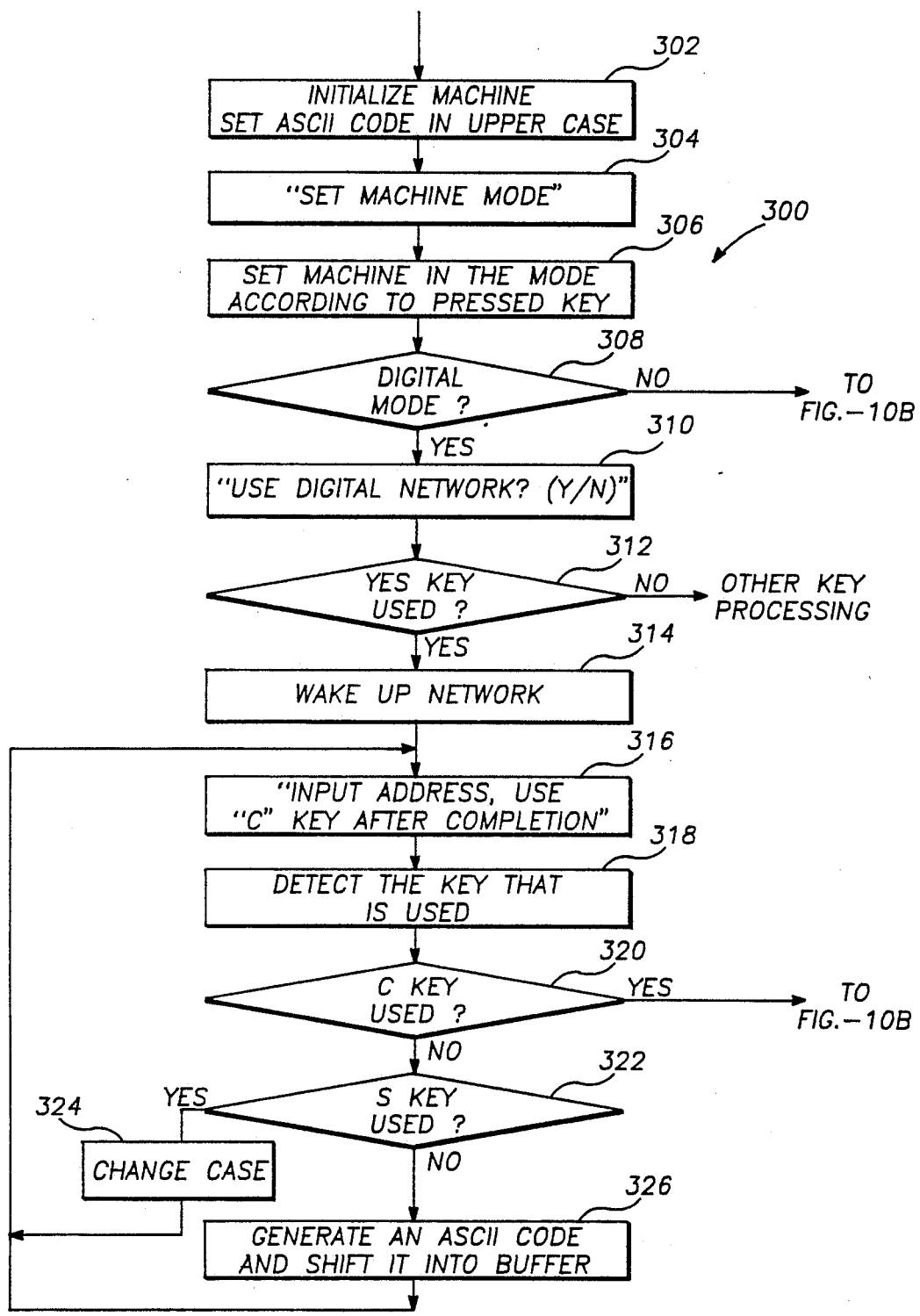
FIG.—10A

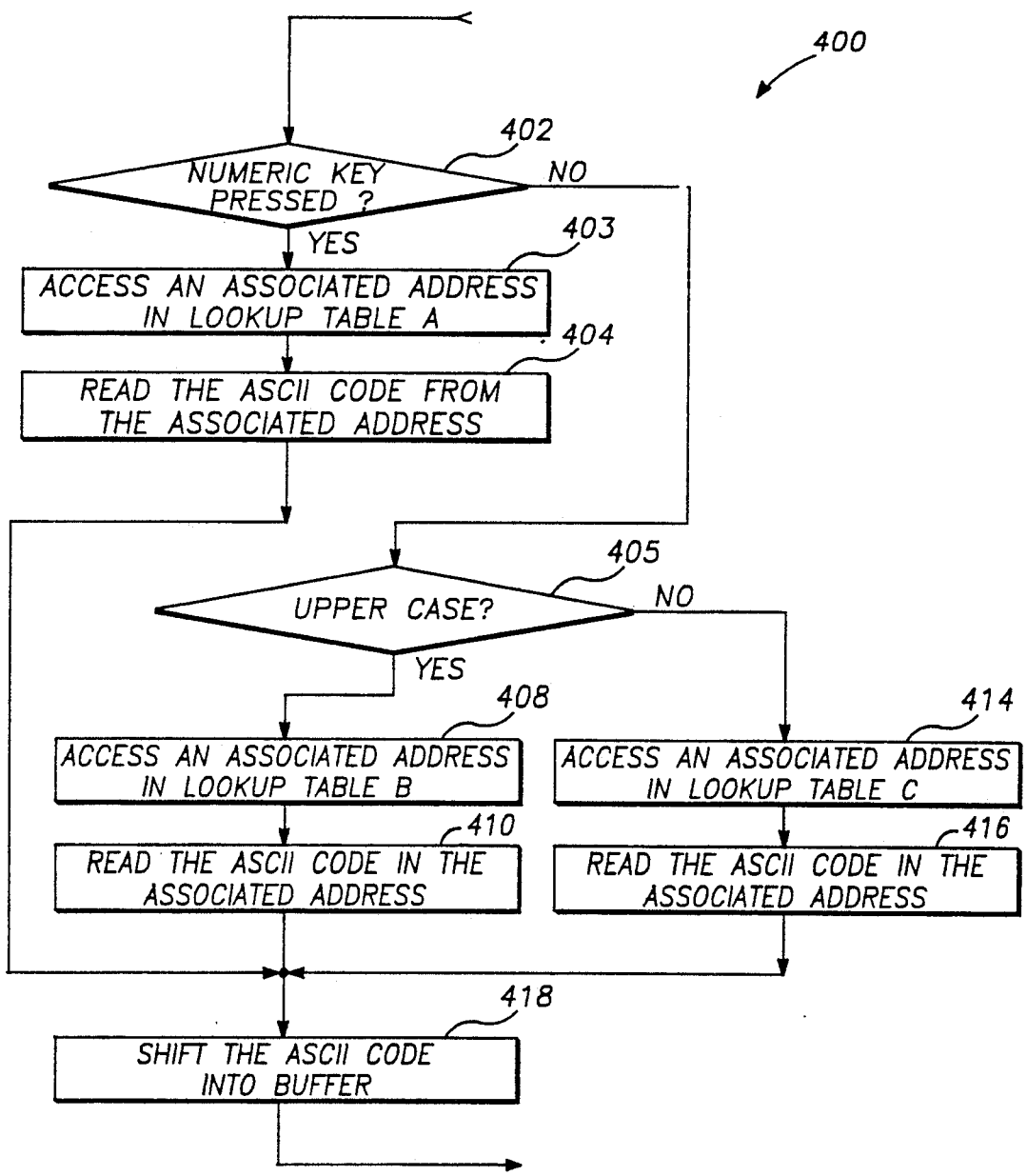
FIG.—11

METHOD AND APPARATUS FOR A FACSIMILE MACHINE HAVING ASCII CODE ADDRESSING CAPABILITY

TECHNICAL FIELD OF THE INVENTION

This invention generally relates to facsimile machines, and more particularly to facsimile machines for use with a digital network and/or analog telephone network.

BACKGROUND OF THE INVENTION

A data transmission network system typically connects with many terminals for data transmission. A first terminal wishing to send data to a desired second terminal must address the second terminal before transmitting the data.

Facsimile machines (or FAX) were initially designed to transmit and receive image data over the analog Public Switched Telephone Network (PSTN) system in accordance with existing protocols. In the PSTN system, the facsimile machines (i.e. terminals) address each other using numeric addresses, including 0, 1, 2 . . . , 9 and sometimes * and # signs. Typically, the addresses have a fixed length in the PSTN system. Because the PSTN system uses ten numerics (0-9) and possibly two additional signs (0-9, * and #) for addressing, it needs no more than 12 keys to represent the addresses.

By contrast, facsimile machines communicating over switched digital networks use addresses that include ASCII codes because such networks were originally designed for computer systems which can generate and identify ASCII codes.

Digital data transmission over a switched digital network offers advantages contrasted to analog data transmission over the PSTN system. For example, many companies already own private digital networks, perhaps for computer networking. If facsimile machines are coupled to these pre-existing digital networks, literally no extra cost is incurred in using the digital network lines.

Further when the image data are transmitted over a digital network in digital format, encryption of the image data is more easily implemented, thus promoting security. For example, the MIL-STD-188-161 B&C standard is a digital image data transmission protocol mandated by the Department of Defense in the design, development and acquisition of its facsimile equipment.

Digital image data transmission over a switched digital network offers the same advantages mentioned above in the civilian sector, and a G4 digital data transmission protocol is being developed. It seems fair to predict that the future of facsimile data transmissions will be strong in digital network.

Unfortunately, conventional facsimile machines do not have the capability to generate ASCII codes for addressing a switched digital network.

Thus, there is a need to provide facsimile machines that generate ASCII code for addressing a switched digital network.

ASCII codes encompass about 128 different codes, and extended ASCII codes encompass 256 different codes. The most popularly used symbols in ASCII code addressing are alpha-numeric (both upper case and lower case), and some special characters such as ":" and "-". Unlike the PSTN network system, addressing of switched digital network can require different lengths of codes. Therefore, it is impractical to represent each ASCII code with a dedicated key.

Thus, for addressing a switched digital network there is a need to represent at least the more popular address codes without imposing undue hardware overhead on the facsimile machines.

The present invention provides facsimile machines and an implementation method meeting both of these needs.

SUMMARY OF THE INVENTION

In a first aspect, this invention provides an apparatus for transmitting and receiving data over a digital network. The apparatus includes means for selecting ASCII addressing codes for addressing a second facsimile machine coupled to the digital network; and means for generating said ASCII addressing codes in response to selections of said selecting means.

The apparatus further includes means for sending said ASCII addressing codes generated by the generating means to the digital network.

The invention also provides a respective method corresponding to the apparatus described in the first aspect.

In a second aspect, the present invention provides an apparatus for transmitting and receiving data over a digital network and/or an analog telephone network. The apparatus includes means for selecting an ASCII address for addressing the digital network, and for selecting a numeric address for addressing the analog telephone network; means for indicating a digital mode and an analog mode; and means for generating said ASCII address and the numeric address in response to selections by the selecting means and in response to the digital and analog modes.

The apparatus also includes means for sending the generated ASCII address to the digital network in response to the digital mode, and for providing said generated numeric addressing code to said analog telephone network in response to the analog mode.

Finally, the present invention provides a respective method corresponding to the apparatus described in the second aspect.

BRIEF DESCRIPTION OF THE DRAWINGS

The purpose and advantages of this invention will be apparent to those skilled in the art from the following detailed description in conjunction with the appended drawings in which:

FIGS. 6A & 6B depict the FAX system control logic and the operation panel of FIG. 5 in detail.

FIGS. 7A & 7B are a flow chart depicting operation of a facsimile machine of FIG. 5.

FIG. 11 depicts in detail step 126 in FIG. 7, and step 326 in FIG. 10.

DETAILED DESCRIPTION OF PREFERRED EMBODIMENTS

This invention comprises a novel facsimile machine and an associated method. The following description is presented to enable any person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
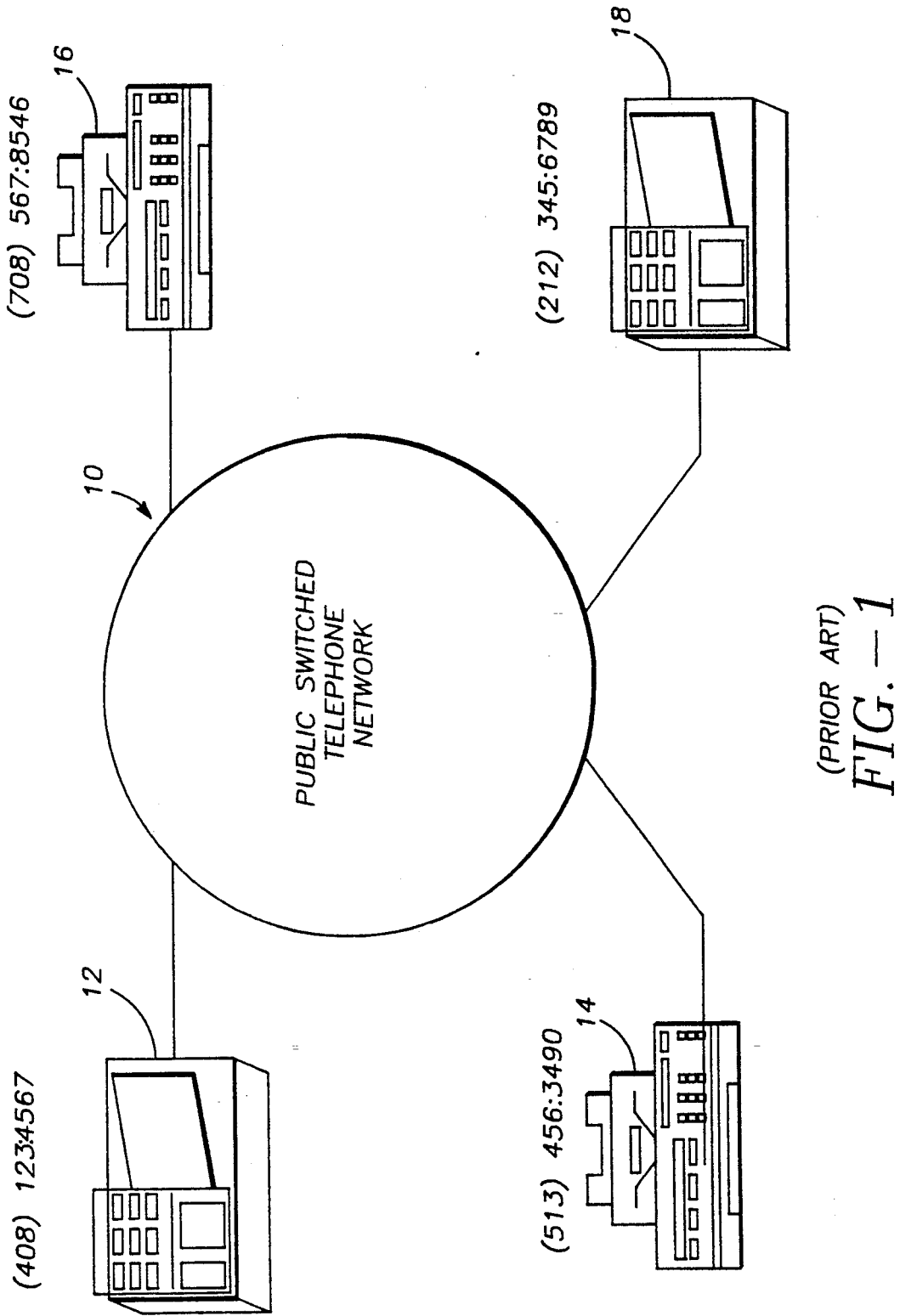
FIG. 1 depicts a public switched telephone network (PSTN) to which four facsimile machines are coupled.

FIG. 1 depicts a public switched telephone network (PSTN) 10, to which four conventional facsimile machines are coupled. The four facsimile machines (12, 14, 16 and 18) associate with four different numeric addresses, by way of example 4081234567, 5134563490, 7085678546, and 2123456789 respectively. Each facsimile machine gains access to another facsimile machine by addressing an associated numeric address to the switched public PSTN 10. The PSTN network then couples the addressing facsimile machine to the addressed facsimile machine.

Figure 2:
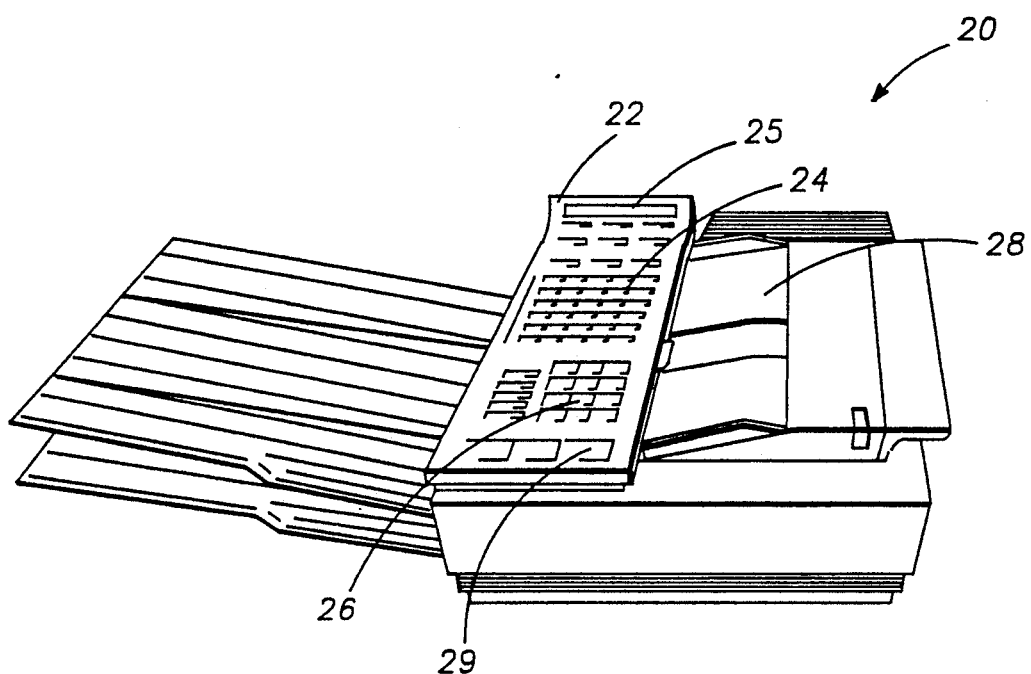
FIG. 2 depicts a conventional facsimile machine including an operation panel.

FIG. 2 depicts in greater detail a conventional facsimile machine that includes an operation panel 22 and a paper holder 28.

Figure 3:
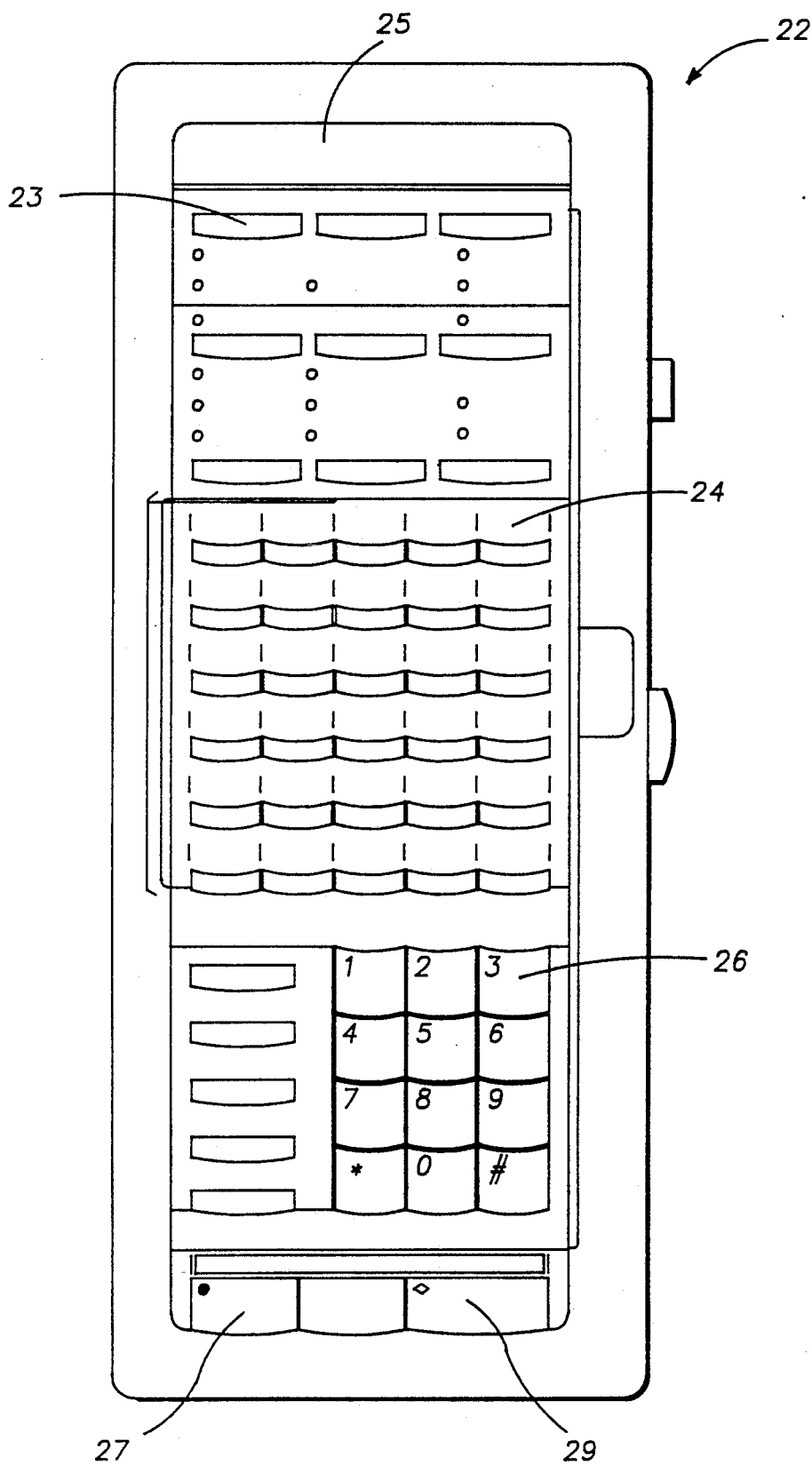
FIG. 3 depicts the operation panel of FIG. 2 in detail.

FIG. 3 depicts an enlarged view of the operation panel shown in FIG. 2. The set of quick dial keys includes thirty keys numbered from 01 to 30, and the set of numeric dial keys includes twelve keys labeled as 0, 1, 2, ..., 9, *, and #. (The corresponding elements in FIGS. 2 and 3 have the same numeral references.) The operation panel may further include a set of quick dial keys 24, a set of numeric dial keys 26, a stop key 27, a start key 29, a function key 23 and a display 25.

To transmit a document image, typically a user first sets the document into paper holder 28 (in FIG. 2), and then specifies the number of document pages by using one or more respective numeric keys. The user also specifies the numeric address associated with a designated facsimile machine, and then uses start key 29 to begin the transmitting process over the PSTN network.

In operating the operation panel of FIG. 3, a user can specify a numeric address by (1) either sequentially using respective keys in numeric dial keys 26, or by (2) using an associated quick dial key 24 once. By way of example, as shown in FIG. 2, if the user wants to use facsimile machine 12 to transmit a document image to facsimile machine 18 (associated with numeric number "2123456789"), the user may sequentially use ten numeric dial keys with a sequence of "2", "1", "2", "3", "4", "5", "6", "7", "8", and "9".

Alternatively, because any quick dial key preferably can be pre-programmed to represent a digit numeric number, the user can address the numeric number by using one quick dial key. For the purpose of illustration, assume that the quick dial key "25" is pre-programmed to represent numeric number "2123456789". Thus, to address facsimile machine 18, the user needs only to use quick dial key "25" once.

Figure 4:
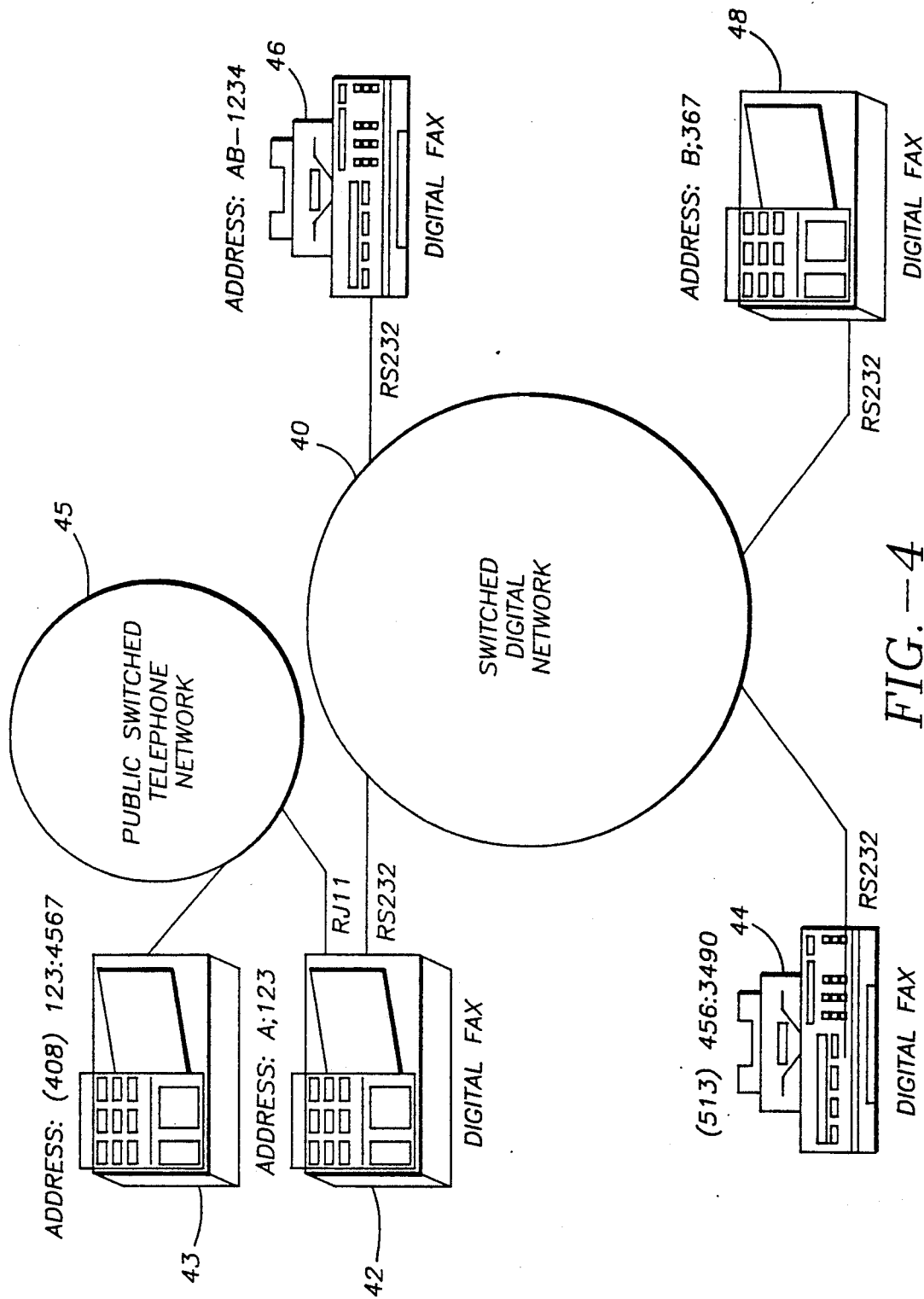
FIG. 4 depicts a switched digital network to which four facsimile machines are coupled, in accordance with the invention.

FIG. 4 depicts a switched digital network 40, to which four facsimile machines are coupled, in accordance with the present invention. The four facsimile machines (42, 44, 46 and 48) associate with four different ASCII addresses, namely "A;123", "A;234", "AB-1234" and "B;367" respectively. Each facsimile machine gains access to another facsimile machine by addressing associated ASCII addresses to switched digital network 40. The switched digital network then couples the addressing facsimile machine to the addressed facsimile. Each facsimile machine preferably has a serial port RS232, and is coupled to the switched digital network 40 via its respective serial port RS232.

The facsimile machines of FIG. 4 preferably can also be coupled to a PSTN network 45. For example, facsimile machine 42 is coupled to both switched digital network 40 and PSTN network 45, and can communicate with facsimile machine 43 (associating with a numeric address "4081234567") over the PSTN network.

Figure 5:
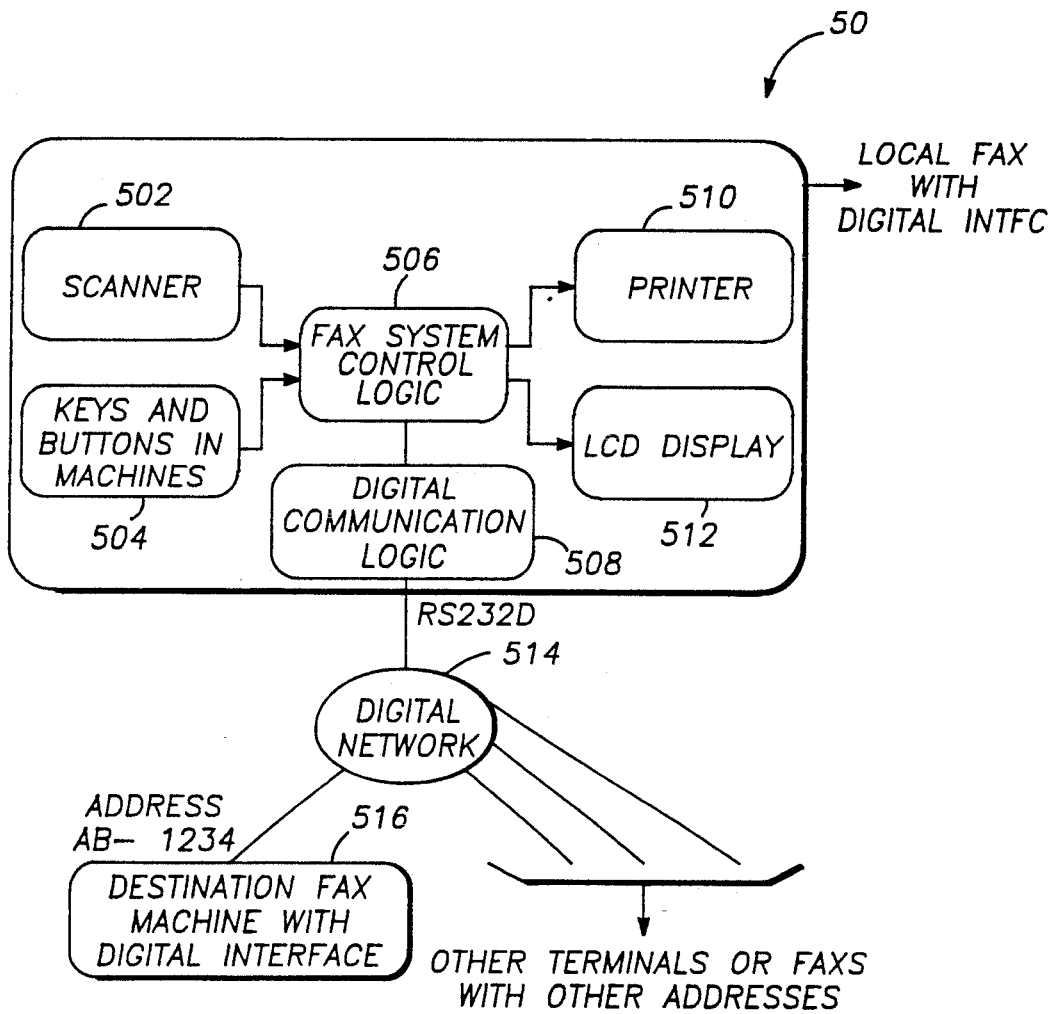
FIG. 5 depicts a circuit block diagram for a facsimile machine of FIG. 4, in accordance with the first embodiment of the present invention.

FIG. 5 depicts a circuit block diagram of a facsimile machine 50 with a digital interface, in accordance with the first embodiment of the present invention. Facsimile machine 50 includes a scanner 502, an operational panel 504 including keys and buttons, a FAX system control logic 506, a digital communication logic 508, a printer 510, and a display 512. The facsimile machine preferably is coupled to digital network 514 through its serial port (RS232D), and can communicate with other facsimile machines that are coupled to digital network 514. A facsimile machine with address "AB- 1234" is coupled to the other end of digital network 514.

The operation of the facsimile machines as shown in FIG. 5 is as follows. FAX control logic 506 controls overall activities of all other function blocks (i.e. 502, 504, 508, 510 and 512). Scanner 502 digitizes the document to be transmitted into image data. Keys and buttons 504 are used to input user information and user command. Digital communication logic 508 communicates with digital network 514, generates protocols, command/response to digital network, and sends image data to or receives image data from digital network. Printer 510 displays (prints) the received image data on papers. LCD display 512 provides status messages and operation prompts to users. To transmit a document over digital network, FAX system control logic 506 receives the digitized document from scanner 502, processes the digitized document to image data, and sends the image data to digital communication logic 508. To receive image data over digital network 514 FAX system control logic 506 receives image data from digital communication logic 508, processes the received image data, and sends the processed image data to printer 510.

FIG. 6 depicts facsimile machine 50 (in FIG. 5) in greater detail. The elements within the dotted line depict details of FAX system control logic 506 (in FIG. 5). The FAX system control logic receives inputs from operation panel 622, and provides address and control signals to digital communication logic 632. The operation panel 622 has the same configurations as that of FIG. 3, except that operation panel 622 further includes a shift (S) key and an address completion (C) key.

FAX system control logic 506 preferably includes three look-up tables 602, 604, 606 (table A, table B, and table C), a multiplexer or MUX 612, a control circuitry 614, and an address buffer 630.

Tables 602, 604, 606 can be three memories especially set for the three look-up tables, or three reserved memory areas in a general purpose memory. In the three look-up tables, the numbers in the left column indicate logic memory addresses, and the numbers in the right column indicate the ASCII codes stored in the memory addresses. The symbols represented by the respective ASCII codes are listed inside the parentheses on the right columns. For example, in look-up table 604, the logic memory addresses from 01 to 26 store ASCII codes from 65 to 90 respectively, which represent upper case English alphabet characters A to Z.

More specifically, look-up table 602 contains ASCII codes representing symbols: 0, 1, 2, . . . , 9, * and # respectively. Look-up table 604 contains ASCII codes representing upper case symbols: A, B, C, . . . , Z, ., space and; respectively. Look-up table 606 contains ASCII codes representing lower case symbols: a, b, c, . . . , z, comma,/ and % respectively. Of course, other look-up implementations are possible.

Address buffer 630 includes n shift registers ($R_1$, $R_2$, $R_3$, $R_4$, . . . , $R_n$) for address buffering, and control circuitry 414 includes a register $R_S$ whose logic state preferably indicates upper case and lower case.

In response to use of keys or buttons on panel 622, control circuitry 614 provides control signals to the three look-up tables 602, 604, 606 (table A, table B, table C), MUX 612, address buffer 630 and digital communication logic 632. Preferably outputs of the three look-up tables are coupled to address buffer 630 via MUX 612. The output of address buffer 630 is shown coupled to digital communication logic 632.

Use of the S key sets the logic state of register $R_S$ into its opposite logic state. Thus, by using the S key, the upper case can be shifted from upper case to lower case (or vice versa).

Controlled by control circuitry 614, the twelve numeric dial keys (0, 1, 2, . . . , 9, * and #) on the operation panel can respectively activate the twelve logic memory addresses (0, 1, 2, . . . , 11) of look-up table 602.

Depending on the logic state of register $R_S$, the thirty quick dial keys (01, 02, 03, . . . , 30) on the operation panel can respectively activate the thirty logic memory addresses (01, 02, 03, . . . , 30) of either look-up table 604 or look-up table 606. Specifically, if the register $R_S$ is in the active logic state, the thirty quick dial keys (01, 02, 03, . . . , 30) respectively activate the thirty logic memory addresses (01, 02, 03, . . . , 30) of look-up table 604. But if the register $R_S$ is in the inactive logic state, the thirty quick dial keys (01, 02, 03, . . . , 30) respectively activate the thirty logic addresses (01, 02, 03, . . . , 30) of look-up table 606.

In response to use of an address key, control circuitry 614 fetches an ASCII code from an associated address in the look-up tables. Before storing the fetched ASCII code into register $R_1$, the control circuitry preferably shifts the content in register $R_1$ into register $R_2$, the content in Register $R_2$ into register $R_3$, . . . , and the content in register $R_{n-1}$ into register $R_n$. The control circuit then stores the fetched ASCII code into register $R_1$. In response to use of the C key, the control circuitry provides ASCII code address stored in $R_1$, $R_2$, . . . , $R_n$ to the digital network via digital communication logic 632.

Operation of the facsimile machines shown in FIGS. 5 and 6 can be best explained by describing a specific example for addressing a facsimile machine associated with address "AB-1234".

Because "A", "B" and "-" are upper case symbols, the user first sets the transmitting facsimile machine in upper case (meaning that register $R_S$ is set in an active logic state to indicate upper case). The user then uses a sequences of quick dial keys "01", "02", "28", and numeric keys "1", "2", "3", and "4".

In response to use of the quick dial key "01", control circuitry 614 activates look-up table 604, and fetches ASCII code 65 from logic memory address 01 into MUX 612. The control circuitry activates look-up table 604 (but not look-up table 606) because register $R_S$ is in the active logic state. Controlled by control circuitry 614, MUX 612 passes the output from look-up table 604 to address buffer 630. Address buffer then stores the ASCII code 65 in register $R_1$.

In response to use of quick dial key "02", control circuitry 614 activates look-up table 604, and fetches ASCII code 66 from logic address 02 into MUX 612. Controlled by control circuitry 614, MUX 612 passes the output from look-up table 604 to address buffer 630. After the ASCII code 65 stored in register $R_1$ has been shifted into register $R_2$, the address buffer stores the ASCII code 66 in register $R_1$.

In response to use of quick dial key "28", control circuitry 614 activates look-up table 604 and fetches ASCII code 45 from logic address 28 into MUX 612. Controlled by control circuitry 614, MUX 612 passes the output from look-up table 604 to address buffer 630. Before address buffer 630 stores the ASCII code 45 in register $R_1$, it shifts the ASCII code 65 stored in register $R_2$ into register $R_3$, and the ASCII code 66 stored in register $R_1$ into register $R_2$. Address buffer 630 then stores the ASCII code 45 in register $R_1$.

In response to use of numeric key "1", control circuitry 614 activates look-up table 602, and fetches ASCII code 49 from logic address 1 into MUX 612. Controlled by control circuitry 614, MUX 612 passes the output from look-up table 602 to address buffer 630. Before address buffer 630 stores the ASCII code 49 in register $R_1$, it shifts the ASCII code 65 stored in register $R_3$ into register $R_4$, the ASCII code 66 stored in register $R_2$ into $R_3$, and the ASCII code 45 stored in register $R_1$ into register $R_2$. Address buffer 630 then stores the ASCII code 49 in register $R_1$.

In response to uses of quick dial keys "02", "03" and "04", the operation repeats the processes of (1) fetching an ASCII code from an associated logic memory address, (2) shifting the ASCII codes stored in lower stage registers into higher stage registers in address buffer 630, and (3) storing the fetched ASCII code in register R1.

After key "4" has been used, registers $R_7$-$R_1$ contain the ASCII codes 65, 66, 45, 49, 50, 51 and 52, respectively.

To send the ASCII address "AB-1234" to the digital network, the C key is used. In response, control circuitry 614 sends the accumulated ASCII codes in registers $R_1$-$R_7$ to digital communication logic 632.

Figure 6A:
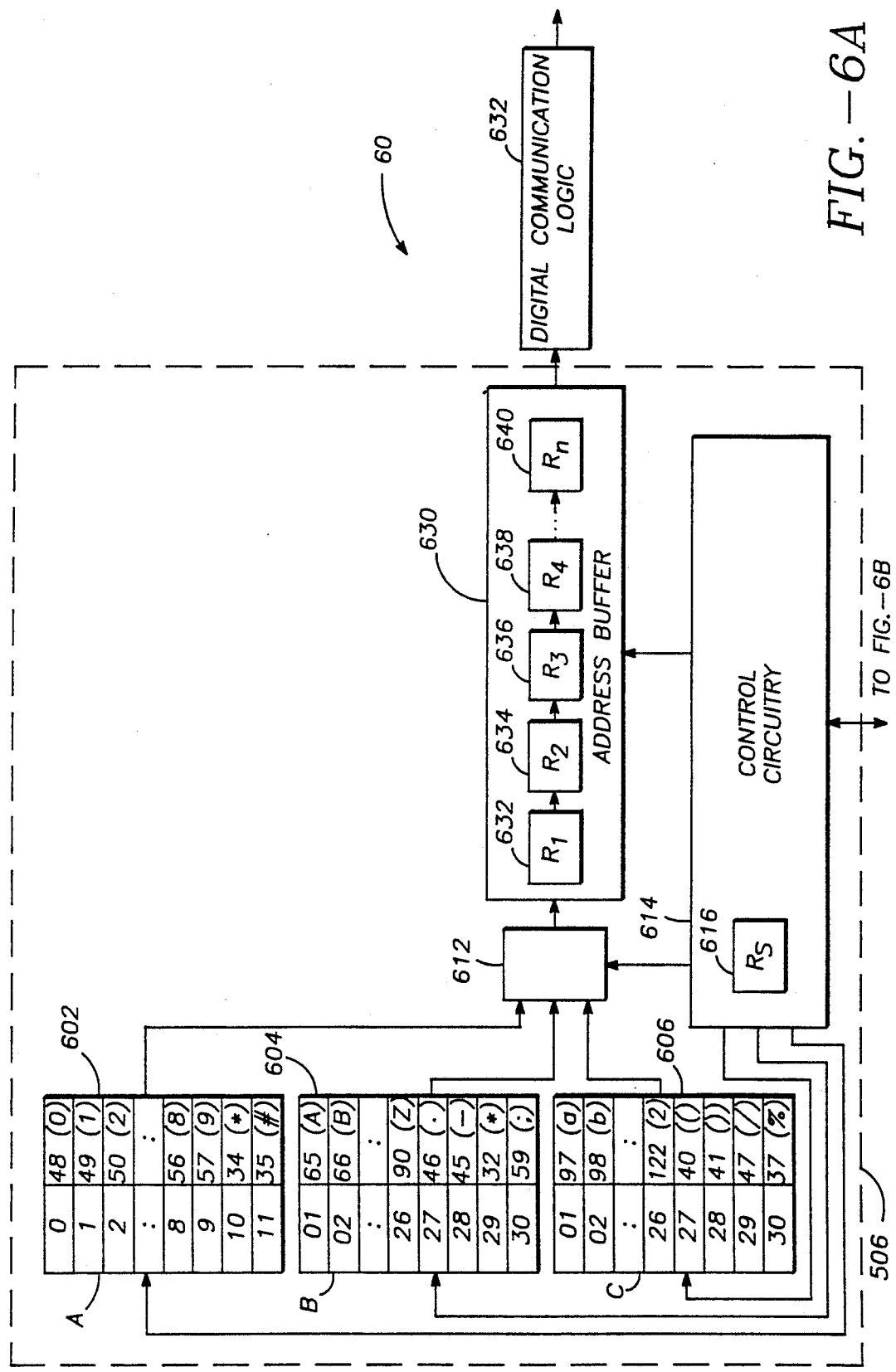
Figure 7B:
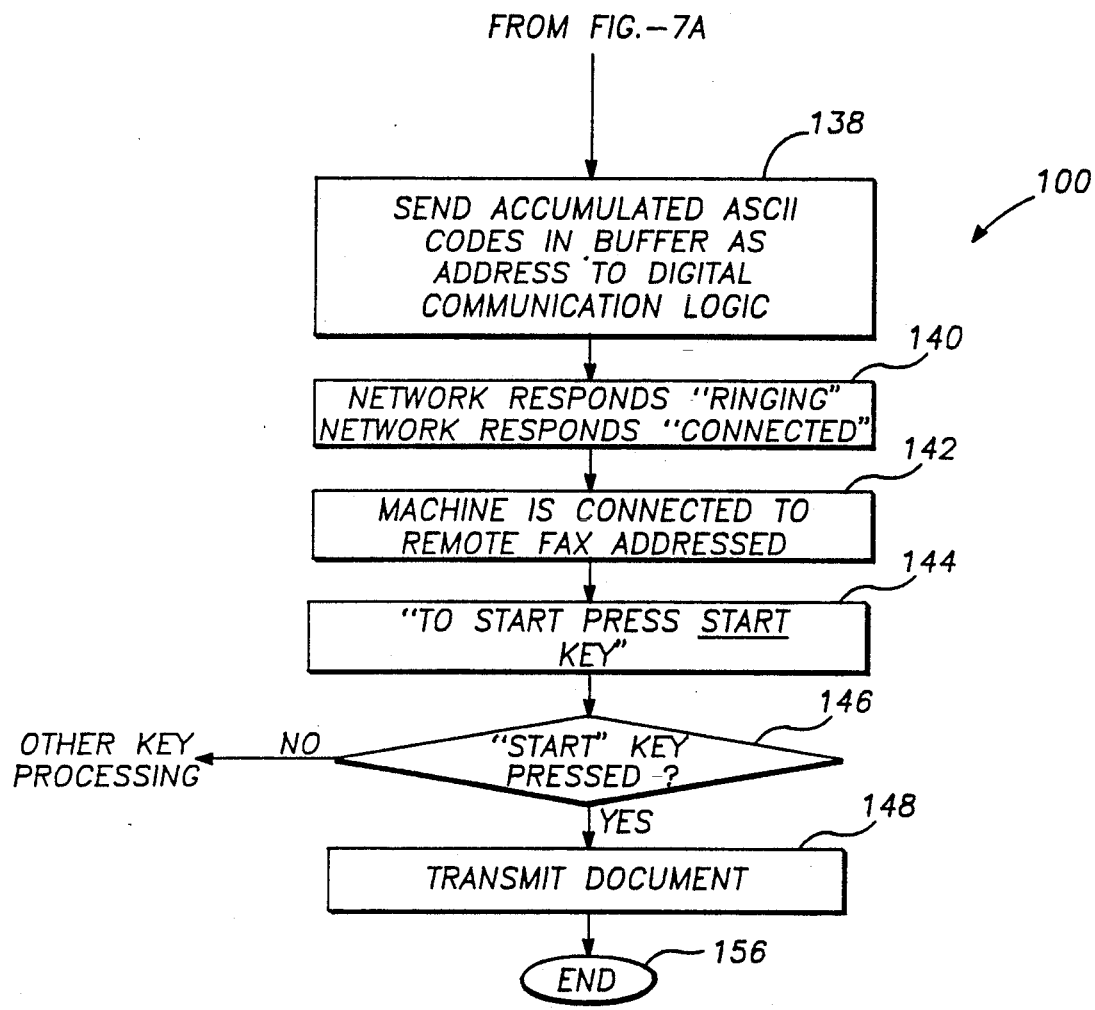

FIG. 7 depicts an operation flow chart for a facsimile machine shown in FIGS. 5 and 6. At step 101 the facsimile machine is set in the digital mode, and at step 106 the operation initializes the facsimile machine and sets it in upper case. At step 110, display 512 (in FIG. 5) prompts to access the digital network by displaying "Use Digital Network? (Y/N)". At step 112, the operation tests whether the "Yes" key was used, and if so the operation leads to step 114 to "wake up" the digital network. The "Wake up" process sends an attentiongetting signal to the digital network. The function of the "wake up" process is analogous to that of "off-hook" in the PSTN network. If step 112 determines that a key other than the "Yes" key was used, the operation leads to other key processing. For example, use of "No" key will take the facsimile machine back to idle state, and use of other keys (Quick Dial keys, Function key, etc) will be ignored.

At step 116, display 512 (in FIG. 5) prompts to input an address by displaying "Input Address, Use C key after Completion". Then, step 118 detects whether any key was activated by the user. Next, step 120 tests whether the C key was used.

If step 120 determines that the C key was not used, the operation leads to step 122 to test whether the S key was used. If step 122 determines that the S key was used, the operation leads to step 124 to change the case by changing the logic state of $R_S$ register 616 of FIG. 6 into the opposite logic state. The operation then leads to step 116 to instruct the user to continue to input the address. But if step 122 determines that other than the S key was used, step 126 generates an ASCII code according to the key used and shifts the ASCII code into address buffer 630 in FIG. 6. After the ASCII code is stored in the address buffer, the operation leads to step 116 to instruct the user to continue to input the address.

If step 120 determines that the C key was used, the operation leads to step 138 to send the accumulated ASCII codes stored in the address buffer as address to digital communication logic 632 in FIG. 6A. At step 140, the digital network responds "ringing" and "connected". In the digital network, messages are passed back and forth in ASCII format to convey the status of the digital network. So when the digital network is indicating to the called terminal that there is an incoming call, it sends a message to the calling terminal saying "ringing". When the called terminal is not busy and has accepted the incoming call, the digital network sends a message to the calling terminal saying "connected". At step 142, the operation couples the transmitting facsimile machine to an addressed remote facsimile machine. At step 144, display 625 in FIG. 6B prompts to start the transmitting process by displaying "To start, use Start key".

Then, step 146 tests whether the Start key was activated by the user, and if so the operation leads to step 148 to transmit the document over the digital network. After the document has been transmitted, the operation terminates at step 156. But if step 146 determines that a key other then the Start key was used, the operation leads to other key processing. For example, use of the "Stop" key will terminate the user's attempt to transmit, and the use of the other keys will be ignored.

Figure 8:
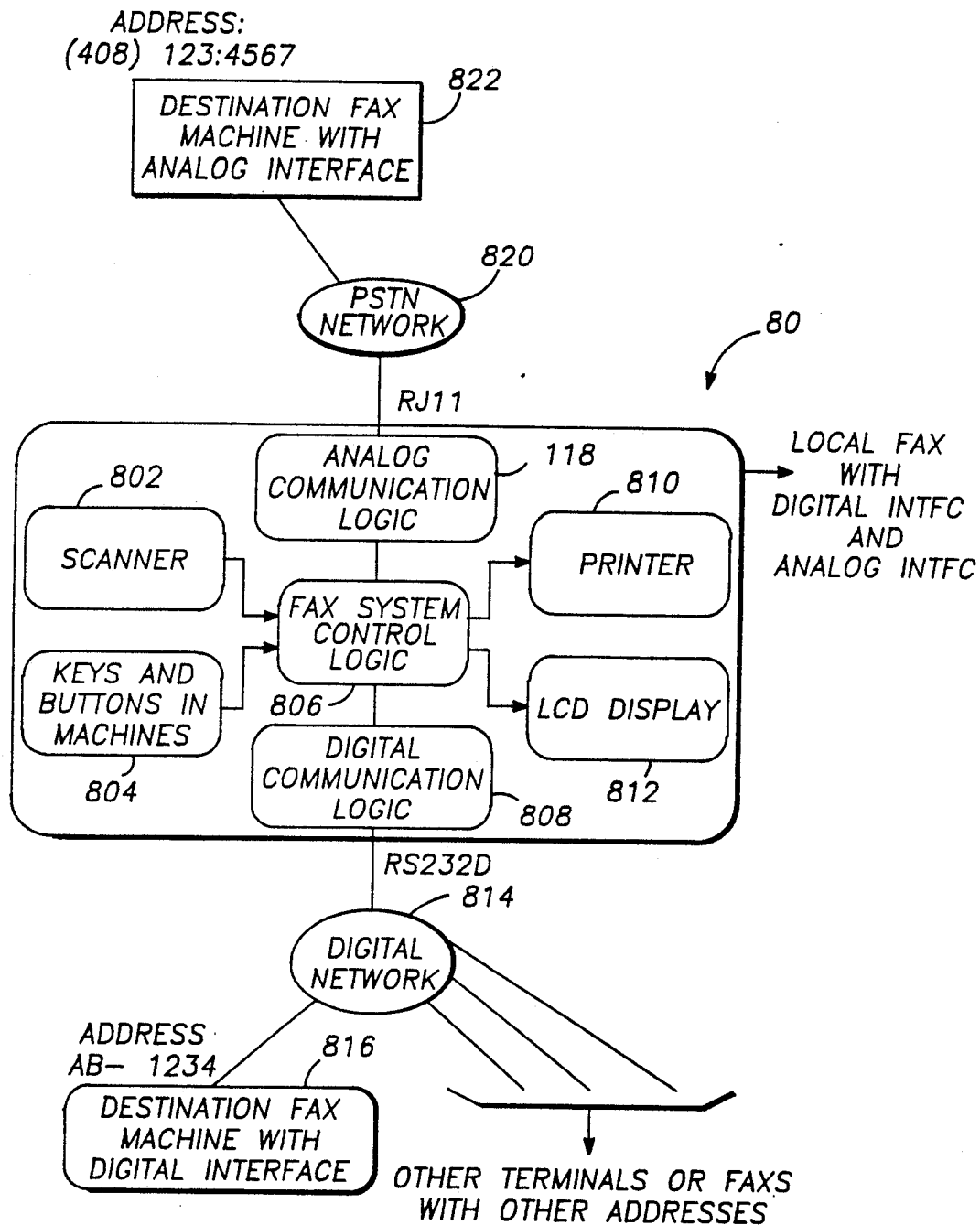
FIG. 8 depicts a circuit block diagram of the facsimile machine in FIG. 7, in accordance with the second embodiment of the invention.

FIG. 8 depicts a circuit block diagram of a facsimile machine 80 which includes a digital interface and an analog interface, in accordance with the second embodiment of the present invention. Facsimile machine 80 includes a scanner 802, and operational panel 804 including keys and buttons, a FAX system control logic 806, a digital communication logic 808, a printer 810, a display 812 and an analog communication logic 818. The facsimile machine preferably is coupled to a digital network 814 through its serial port (RS232D), and to the PSTN network through telephone port (RJ11). Facsimile machine 80 can communicate with other facsimile machines that are coupled either to digital network 814 or to PSTN network 820, including facsimile machine 816 (with ASCII address "AB-1234") and facsimile machine 822.

The serial port (RS232D) converts the image data generated by facsimile machine 80 into a compatible format for digital network 814, and converts the image data received from digital network 814 into a compatible format for facsimile machine 80. Similarly, the telephone port (RJ11) converts the image data generated by facsimile machine 80 into a compatible format for PSTN 820, and converts the image data received from PSTN 820 network into a compatible format for facsimile machine 80.

Operations of function blocks 802, 804, 806, 808, 810 and 812 in FIG. 8 are similar to these of function blocks 502, 504, 506, 508, 510 and 512 shown in FIG. 5 respectively. Digital communication logic 808 communicates with digital network 814, generates protocols, command/response to the digital network, and sends image data to or receives image data from the digital network. Analog communication logic 818 communicates with the PSTN network 820, generates protocols, communication timings and tones, and detects tones for the PSTN network. FAX control logic 806 controls overall activities of all other function blocks (i.e. 802, 804, 808, 810, 812 and 818).

To transmit a document over digital network 814, FAX system control logic 806 receives the digitized document from scanner 802, processes the digitized document to image data, and sends the image data to digital communication logic 808. To receive image data over digital network 814, FAX system control logic 806 receives image data from digital communication logic 808, processes the received image data, and sends the processed image data to printer 810.

To transmit a document over PSTN network 820, FAX system control logic 806 receives the digitized document from scanner 802, processes the digitized document to image data, and sends the image data to analog communication logic 818. To receive image data over PSTN network, FAX system control logic 806 receives image data from analog communication logic 818, processes the received image data, and sends the processed image data to printer 810.

Figures 1, 9A:
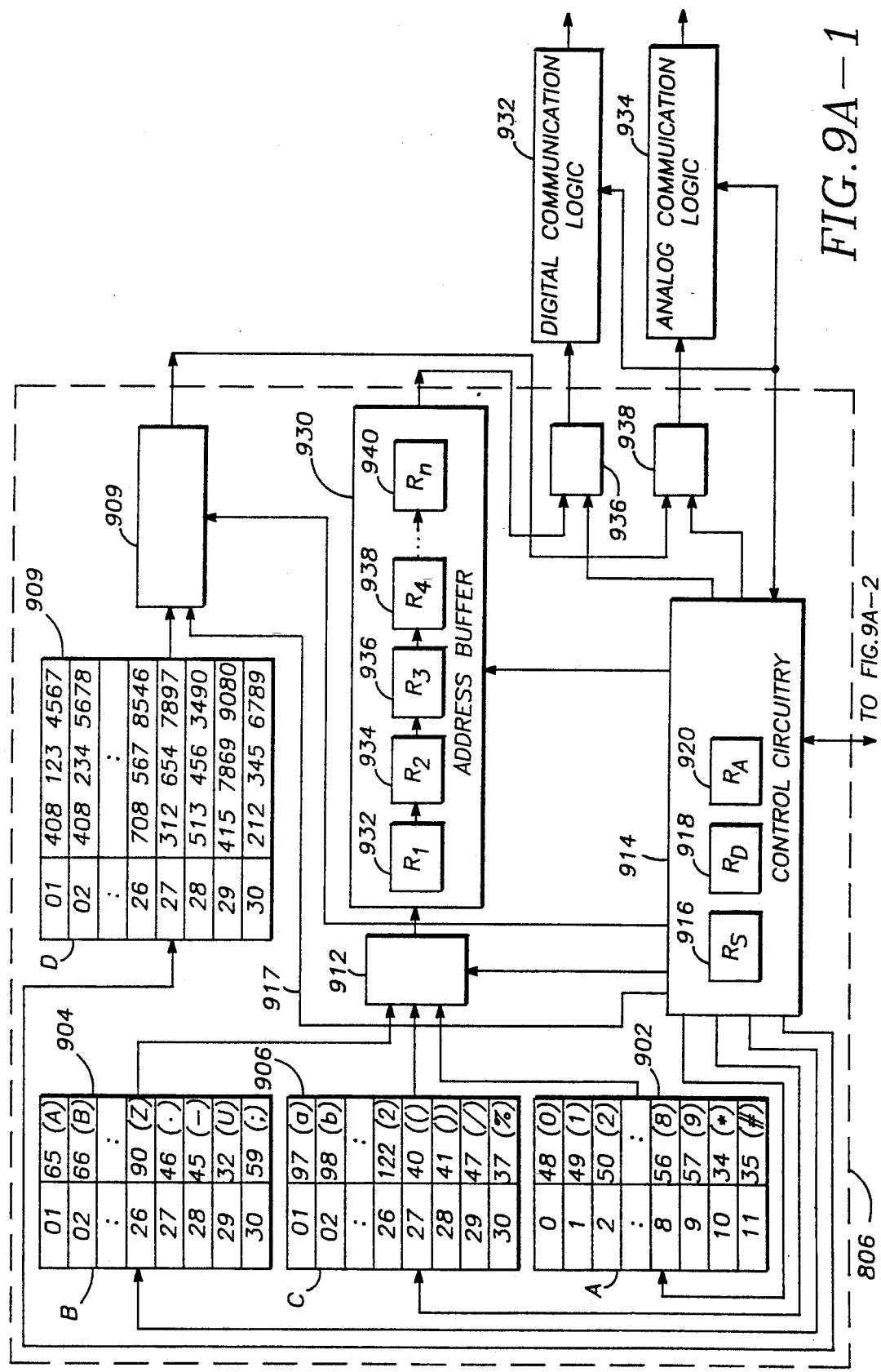
FIGS. 9A(1 & 2) and 9B depict the FAX system control logic of FIG. 8 in detail.

FIG. 9A depicts the facsimile machine 80 (in FIG. 8) in greater detail, where the elements within phantom line box depict details of FAX system control logic 806. The FAX system control logic receives inputs from operation panel 922, and provides control signals to digital communication logic 932 and to analog communication logic 934. The operation panel 922 has the same configuration as that of FIG. 3, except that operation panel 922 further includes an S key, a C key, a digital mode (D) key, and an analog mode (A) key.

FAX system control logic 806 preferably includes four look-up tables (902, 904, 906 and 908), a MUX 912, an control circuitry 914, two address buffers (909, 930), and gates 936 and 938.

Look-up tables 902, 904, 906 have the respective same structures and functions as look-up tables 602, 604, 606 in FIG. 6A. The descriptions for look-up tables 602, 604, 606 also apply to look-up table 902, 904, 908, and thus no further detail will be given herein.

As to look-up table 908, the numbers in the left column indicate logic memory addresses, and the numbers in the right column indicate numeric addresses stored in the respective memory addresses. For example, the logic memory addresses 01 and 30 store numeric address "4081234567" and "2123456789" respectively.

Address buffer 930 includes n shift registers ($R_1$, $R_2$, $R_3$, $R_4$, ..., $R_n$) for address buffering. The control circuitry 914 includes a register $R_S$ for indicating upper case and lower case, a register $R_D$ for indicating digital mode, and a register $R_A$ for indicating analog mode.

Control circuitry 914 receives and decodes requests from operation panel 922, and in response provides control signals to the four look-up tables 902, 904, 906, 908 (table A, table B, table C, table D), MUX 912, address buffers (909, 930) and gates 936, 938. The outputs of three look-up tables (902, 904, 906) are coupled to address buffer 930 via MUX 912, and the output of the fourth look-up table (D) is coupled to address buffer 909. The outputs of address buffers 909, 930 are coupled to gates 936, 938 respectively. The outputs of gates 936, 938 are coupled to digital communication logic 932 and to analog communication logic 934 respectively.

The function of S key in FIG. 9A-2 is the same as that in FIG. 6B, and for that reason will not be further described herein.

Use of the D key sets register $R_D$ in an active logic state and register $R_A$ in an inactive logic state, thus indicating digital mode operation. On the other hand, use of the A key sets register $R_D$ in an inactive logic state and register $R_A$ in an active logic state, thus indicating analog mode operation.

Depending on the logic states of registers $R_D$ and $R_A$, the twelve numeric dial keys (0, 1, 2, ..., 9, * and #) on the operation panel 922 can either activate the respective twelve logic addresses (0, 1, 2, ..., 11) of look-up table 902 or generate a digital number in response to a key that is used. Specifically, if register $R_D$ is in the active logic state and register $R_A$ is in the inactive logic state, uses of the numeric keys (0, 1, 2, ..., 9) activate the respective logic addresses (0, 1, 2, ..., 9) in look-up table 902. But if register $R_D$ is in the inactive logic state and register $R_A$ is in the active logic state, uses of the numeric keys (0, 1, 2, ..., 9) generate ten digital numbers (0, 1, 2, ..., 9) respectively.

Depending on the logic state of register $R_s$, the thirty quick dial keys (01, 02, 03, ..., 30) on operation panel 922 can respectively activate the thirty logic addresses (01, 02, 03, ..., 30) of either look-up table 904 or look-up table 906. Specifically, if the register $R_s$ is in the active logic state, the thirty quick dial keys (01, 02, 03, ..., 30) can respectively activate the thirty logic addresses (01, 02, 03, ..., 30) of look-up table 904. But if the register $R_s$ is in the inactive logic state, the thirty quick dial keys (01, 02, 03, ..., 30) can respectively activate the thirty logic addresses (01, 02, 03, ..., 30) of look-up table 906.

Responding to key use, control circuitry 914 fetches an ASCII code from an associated address in a respective look-up table to MUX 912. Before the control circuitry stores the ASCII code into register $R_1$, it shifts the content in register $R_1$ into register $R_2$, the content in register $R_2$ into register $R_3$, ..., and the content in register $R_{n-1}$ into register $R_n$. Control circuitry 914 then stores the ASCII code into register $R_1$.

To input, for example, an ASCII address "A-bz09", the user first sets the transmitting facsimile machine in the digital mode and upper case. Then user activates keys in a sequences of quick dial keys "01" and "28", S key, quick dial keys "02" and "26", numeric keys "0", and "9", and C key.

In response to use of quick dial key "01", addressing control circuitry 914 activates look-up table 904, and fetches ASCII code 65 from logic address 01 into MUX 612. Controlled by control circuitry 914, MUX 912 passes the output from look-up table 904 to address buffer 930, and address buffer 930 stores the ASCII code 65 in register $R_1$.

In response to use of quick dial key "28", control circuitry 914 activates look-up table 904, and fetches ASCII code 45 from logic address 28 into MUX 612. Controlled by control circuitry 914, MUX 612 passes the output from look-up table 904 to address buffer 930. Before address buffer 930 stores the ASCII code 45 in register $R_1$, it shifts the ASCII code 65 stored in register $R_1$ into register $R_2$. Address buffer 930 then stores the ASCII code 45 in register $R_1$.

In response to use of S key, addressing control circuitry 914 sets register $R_s$ in the inactive logic state, indicating that the facsimile machine is now set in lower case.

In response to use of "01" key, control circuitry 914 activates look-up table 906 (instead of activating look-up table 904) because register $R_s$ has been re-set in the inactive logic state. Control circuitry 914 fetches ASCII code 98 from logic address 02 to MUX 912. Controlled by the control circuitry, MUX 612 passes the output from look-up table 904 to address buffer 930. Before address buffer 930 stores the ASCII code 98 to register $R_1$, it shifts the ASCII code 45 stored in register $R_2$ into $R_3$, and the ASCII code 65 stored in register $R_1$ into $R_2$. Address buffer 930 then stores ASCII code 98 to register $R_1$.

In response to use of quick dial key "26", the operation repeats the process of (1) fetching the ASCII code 122 from logic memory address 26 in look-up table 906, (2) shifting the ASCII codes stored in lower stage registers into higher stage registers in address buffer 914, and (3) storing the fetched ASCII code in register $R_1$.

In response to uses of numeric keys "0" and "9", the operation implements the process: (1) fetching the ASCII codes 48 and 57 from logic addresses 0 and 9 in look-up table 902 respectively, (2) shifting the ASCII codes stored in lower stage registers into higher stage registers in address buffer 914, and (3) storing the fetched ASCII codes in register $R_1$.

Figures 2, 9A:
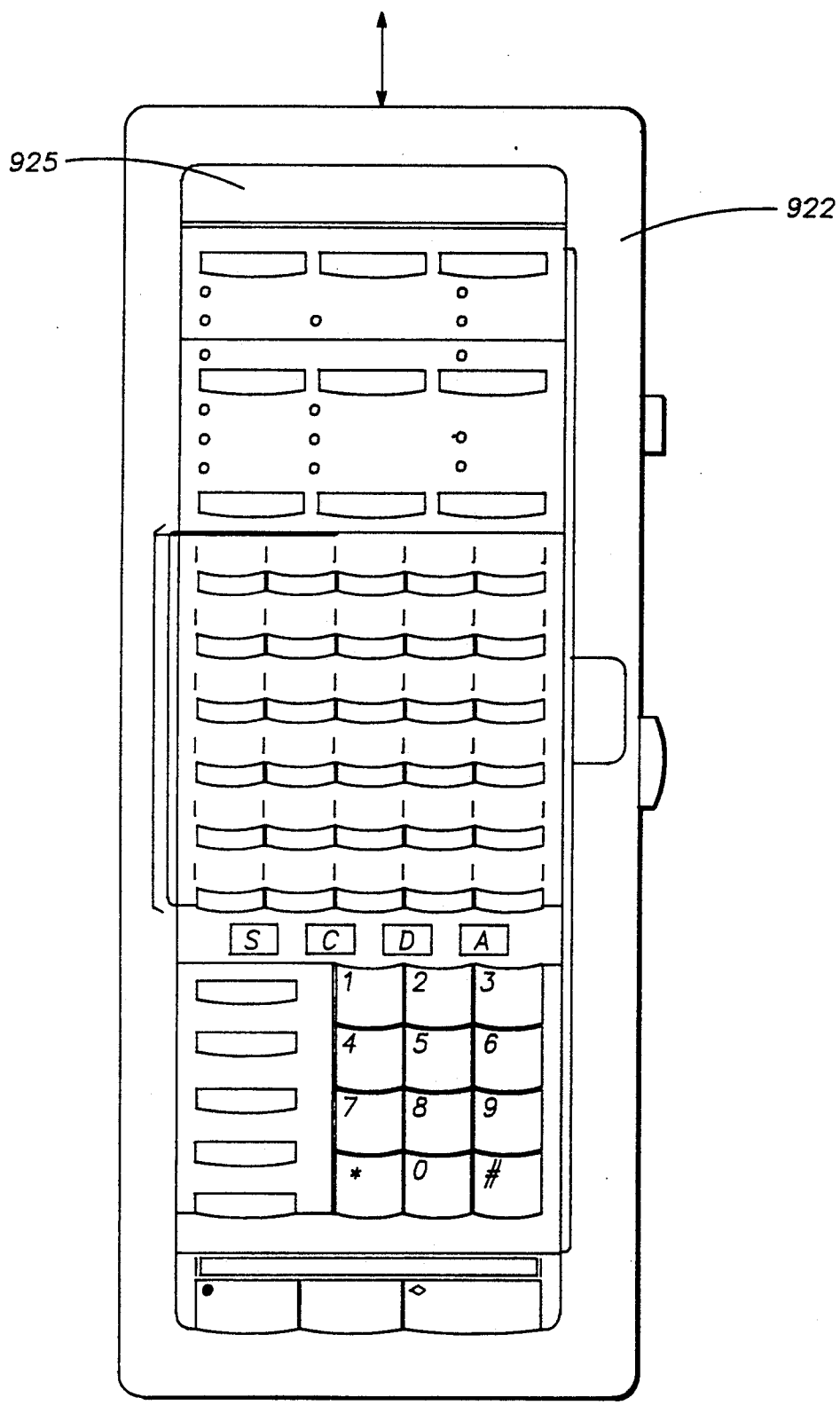

After numeric key "9" has been used, registers $R_6$–$R_1$ of FIG. 9 contain ASCII codes 65, 45, 98, 122, 48 and 57, respectively.

To send the address "A-bz09" to the digital network, the user uses the C key. Because register $R_D$ is in the active state and register $R_A$ is in the inactive state, control circuitry 914 sends the accumulated ASCII codes in registers $R_1$–$R_6$ to digital communication logic 932 via gate 936.

To input the numeric address "4081234567", the A key is first used to set the facsimile machine in the analog mode. In response to the use of A key, addressing control circuitry 914 sets register $R_D$ in the inactive logic state, and register RA in the active logic state.

Because the quick dial key "01" is pre-programmed to represent the numeric address number "4081234567", the user only needs to use quick dial key "01"once. In response to such use, addressing control circuitry 914 activates look-up table 908 and fetches numeric address "4081234567" from logic address 01 to address buffer 909 (via line 915 in FIG. 9A).

Alternatively, the user may use ten numeric keys in a sequence of "4", "0", "8", "1", "2", "3", "4", "5", "6", "7" followed by the Start key. In response to the uses of the numeric keys, control circuitry 914 generates numeric address and sends the address to address buffer 909 (via line 917 in FIG. 9A).

In response to the use of the Start key, control circuitry 914 sends the numeric address in address buffer 909 to analog communication logic 934 via gate 938.

FIG. 9B depicts further detail of facsimile machine 80 shown in FIG. 8. The structure within the phantom line box depicts the elements of FAX system control logic 806 (in FIG. 8) for generating and decoding FAX data. The FAX system control logic 806 preferably includes control circuitry 914, FAX data generator 952, FAX data decoder 954, and four gates 956, 958, 962, 964.

Control circuitry 914 has the same structure as that in FIG. 9A, and thus will not be described in detail herein. The control circuitry is bi-directionally coupled to digital communication logic 932, and to analog communication logic 934.

Before starting transmitting or receiving image data, registers $R_D$ and $R_A$ should be set into proper logic states. As described, to transmit a document, the user sets registers $R_D$ and $R_A$ in the proper logic states. To receive image data from a remote facsimile, digital communication logic 932 or analog communication logic 934 sets registers $R_D$ and $R_A$ into proper logic states. Specifically, for receiving image data over the digital network, digital communication logic 932 sets register $R_D$ in the active logic state and register $R_A$ in the inactive state. But for receiving image data over the PSTN, analog communication logic 934 sets register $R_D$ in the inactive logic state and register $R_A$ in the active state.

The input of FAX data generator 952 is coupled to scanner 802 (in FIG. 8). The output of FAX data generator 952 is coupled to digital communication logic 932 and analog communication logic 934 via gates 956, 958 respectively. The scanner converts the document to be transmitted into image data. Upon receiving the image data, FAX data generator 952 generates FAX data.

The output of FAX data decoder 954 is coupled to printer 810 in FIG. 8. The input of the FAX data decoder is coupled to the outputs of digital communication logic 932 and analog communication logic 934 via gates 962, 964 respectively. FAX data decoder 954 converts the FAX data into data usable by the printer. Upon receiving the printable data, the printer outputs the data.

Depending on the logic states of $R_D$ and $R_A$ registers, FAX control logic 806 (in FIG. 8) provides FAX data to either digital communication logic 932 or analog communication logic 934. Similarly, depending on the logic states of $R_D$ and $R_A$ registers, the FAX control logic receives FAX data from either digital communication logic 932 or analog communication logic 934.

Specifically, during the image data transmission process, if register $R_D$ is in the active logic state, and register $R_A$ in the inactive logic state control circuitry 914 enables gate 956 and disables gate 958. As a result, the output of FAX data generator 952 is coupled to the input of digital communication logic 932. But if register $R_D$ is in inactive logic state and register $R_A$ in the active logic state, control circuitry 914 disables gate 956 and enables gate 958. As a result, the output of FAX data generator 952 is coupled to the input of analog communication logic 932.

Upon receiving the FAX data, digital communication logic 932 (or analog communication logic 934) transmits the data to an addressed remote facsimile.

During image data receiving process, if register $R_D$ is in the active logic state and register $R_A$ in the inactive logic state, control circuitry 914 enables gate 962 and disables gate 964. As a result, the output of digital communication logic 932 is coupled to FAX data decoder 954. But if register $R_D$ is in inactive logic state and register $R_A$ in active logic state, control circuitry 914 disables gate 962 and enables gate 964. As a result, the output of analog communication logic 934 is coupled to FAX data decoder 954.

Figure 10B:
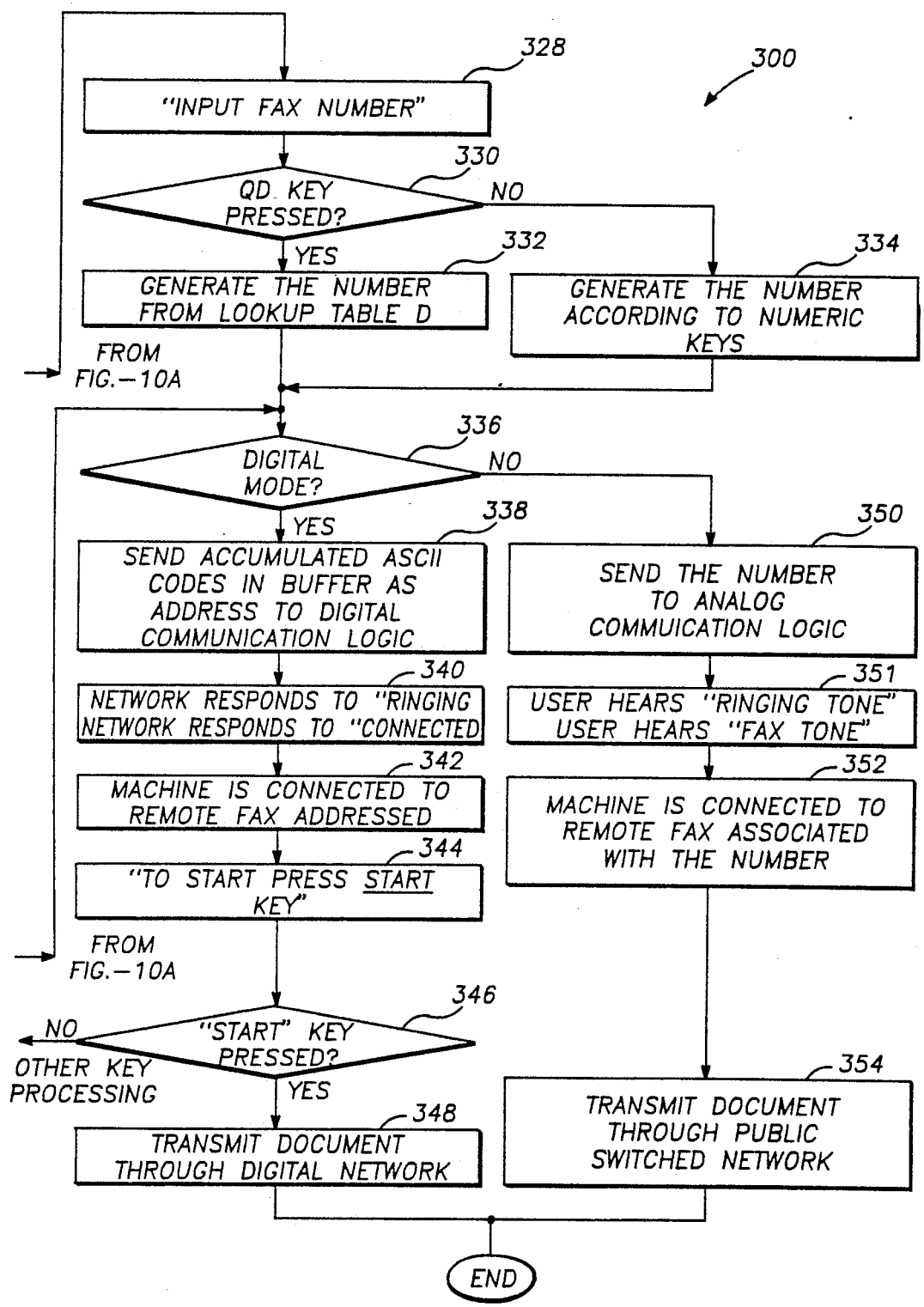
FIGS. 10(A & B) are flow charts depicting operation of the facsimile machine in FIG. 8.

FIGS. 10(A & B) depicts an operation flow chart for the second embodiment shown in FIGS. 8 and 9A-B. At step 302, the operation initializes the facsimile machine and sets ASCII code in upper case. At step 304, display 925 (in FIG. 9) prompts to set the facsimile machine in a digital mode or an analog mode by displaying "Set Machine Mode". Next, step 308 tests what mode the facsimile machine is set.

If step 308 determines that the facsimile machine is set in digital mode, the operation leads to step 310, at which the display 925 (in FIG. 9) prompts to access to the digital network by displaying "Use Digital Network-?(Y/N)". Then, step 312 tests whether the "Yes" key was used.

• If step 312 determines that the "Yes" key was not used, the operation leads to other key processing (step 312 has the same function as step 112 of FIG. 7). But if step 312 determines that the "Yes" key was used, the operation leads to step 314 to "wake up" the digital network (step 314 has the same function as step 114 of FIG. 7A).

At step 316, display 925 (in FIG. 9A) prompts to input an ASCII address by displaying "Input Address, Use C key after Completion". Next, step 318 detects what key was used. After step 318 has detected that a key was used, step 320 further tests whether the C key was used.

If step 320 determines that a key other than the C key was used, the operation leads to step 322 to further test whether the S key was used to request case change. If step 322 determines that the S key was used, the operation leads to step 324 to change the case (by changing the logic state of $R_s$ register 916 of FIG. 9 into an opposite logic state). The operation then leads to step 316 to instruct the user to continue to input address. But if step 322 determines the S key was not used (which means that an address key was used), step 326 generates an ASCII code according to the address key used and shifts the ASCII code into address buffer 930 in FIG. 9A. After the ASCII code is stored in the address buffer, the operation leads to step 316 to instruct the user to continue to input address.

After the ASCII address has been inputted, the user will use the C key. Thus, if step 320 determines that the C key was used, the operation leads to step 336 to test whether the facsimile machine is set in a digital mode or an analog mode.

When the operation leads to step 336 from step 320, the facsimile machine has to be in digital mode. Thus, the operation leads to step 338 to send the accumulated ASCII codes in address buffer 914 (in FIG. 9A) as an address to digital communication logic 932 (in FIG. 9A). At step 340, the digital network responds "ringing" and then "connected" (step 340 has the same function as step 140 of FIG. 7). At step 342, the operation couples the transmitting facsimile machine to the addressed remote facsimile machine. At step 344, display 925 in FIG. 9A prompts use of the Start key to begin the transmitting process by displaying "To start, use Start key."

Then, step 346 tests whether the Start key was used. If step 346 determines that the Start key was not used, the operation leads to other key processing (step 346 has the same function as step 146 of FIG. 7). But if step 346 determines that the Start key was used, the operation leads to step 448 to transmit the document. After the document has been transmitted over the digital network, the operation terminates at step 356.

If step 308 determines that the facsimile machine is set in analog mode, the operation leads to step 328, at which the display 925 (in FIG. 9A) prompts to input the desired number by displaying "Input FAX Number". Then, step 320 tests whether a quick dial key was used.

If step 330 determines that a quick dial key was used, the operation leads to step 332 to fetch a number from look-up table 908, and store the number into address buffer 909 (in FIG. 9A). But if step 330 determines that numeric key was used, the operation leads to step 334 to generate the desired number according to the numeric keys used, and to store such number into address buffer 909 (in FIG. 9A).

After the desired address number has been generated (either at step 332 or 334), the operation leads to step 336 to test the mode of the facsimile machine.

When the operation leads to step 336 from step 332 or 334, the facsimile machine has to be in analog mode. Thus, the operation leads to step 350 to send the number in address buffer 909 (FIG. 9A) as an address to analog communication logic 934 (FIG. 9A). At step 351, the user hears "ringing tone" and "FAX tone". At step 352, the facsimile machine is coupled to an addressed remote facsimile machine. At step 354, the operation transmits the document over the PSTN network. After the document has been transmitted, the operation terminates at step 356.

FIG. 11 depicts details of step 126 (in FIGS. 7(A & B)) or step 326 (in FIG. 10). At step 402, the operation tests whether a numeric key has been used. If step 402 determines that a numeric key has been used, the operation leads to step 403 to access an associated address in look-up table A (in FIGS. 6A, 6B or FIG. 9A). Then, step 404 reads the ASCII code from the associated address.

If step 402 determines that a quick dial key was used, the operation leads to step 405 to further test whether the facsimile machine is set in upper case or lower case. If step 405 determines that the facsimile machine is set in upper case, the operation leads to step 408 to access an associated address in look-up table B (in FIGS. 6A, 6B or FIG. 9A). Then, step 410 reads the ASCII code from the associated address. But if step 405 determines that the facsimile machine is set in lower case, the operation leads to step 414 to access an associated address in look-up table C (in FIGS. 6A, 6B or FIG. 9A). Then, step 416 reads the ASCII code from the associated address.

After the ASCII code has been read out at step 404, 410 or 416, the operation leads to step 418 to shift the ASCII code into address buffer 630 (in FIG. 6) or 930 (in FIG. 9A).

It should be appreciated that the facsimile machine as shown in FIGS. 8, 9A and 9B can generate sufficient ASCII codes to address the digital network without unduly increasing the number of keys on the operation panel. In fact, the present invention can generate sufficient ASCII codes using existing operation panels designed for conventional facsimile machines with minor or no modifications.

For example, the "function" key and the ":" key can replace the "S" (shift) key, the "function" key and the ";" key can replace "C" (address completion) key, the "function" key and the "*" key can replace "D" (digital mode) key, and the "function" key and the "#" key can replace "A" (analog mode) key. By such arrangements, the present invention can use existing operation panels (as shown in FIG. 3) designed for conventional facsimile machines without modification.

Once the present invention is placed in an analog mode, it should also be appreciated that the ASCII code addressing capability does not change the use of existing operation panels for addressing the PSTN network. As described in the specification, to address the PSTN network, the operation procedure of the operation panel shown in FIG. 9A is compatible with that of the existing operation shown in FIG. 3.

These two features enhance the market value of the present invention in compatibility and low hardware overhead cost.

While two particular embodiments of the invention have been described in detail, it will be understood that the invention may be implemented through alternative embodiments. For example, registers 932, 934, 936, 938 and 940 (shown in FIG. 9A) can be replaced by a plurality of memory cells to buffer address codes. Thus, the scope of the invention is not intended to be limited to the embodiments described above, but is to be defined by the appended claims.

What is claimed:

1. A facsimile machine for transmitting and receiving data over a digital network, comprising:
    first selecting means for selecting ASCII addressing codes for addressing a second facsimile machine coupled to said digital network; and
    first generating means for generating said ASCII addressing codes in response to selections made with said first selecting means.

2. The facsimile machine of claim 1, further comprising:
    means for sending said ASCII addressing codes generated by said first generating means to said digital network.

3. The facsimile machine of claim 2, wherein said first generating means comprises:
    means for storing said ASCII addressing codes, wherein said first selecting means identifies said ASCII addressing codes stored in said storing means.

4. The facsimile machine of claim 3, wherein said first generating means further comprises:
    means for buffering ASCII addressing codes selected from said storing means; and
    means for transmitting selected ASCII codes from said storing means to buffering means.

5. The facsimile machine of claim 4, wherein:
    said first selecting means includes a plurality of selecting units;
    said storing means includes a plurality of storage units;
    each of said selecting units identifies a specific ASCII addressing code stored in one of said storage units.

6. The facsimile machine of claim 5, wherein:
    said plurality of selecting units includes a set of conventional facsimile quick dial keys adapted for selecting ASCII addressing codes; and said plurality of selecting units includes a set of conventional facsimile numeric keys adapted for selecting ASCII addressing codes.

7. The facsimile machine of claim 5, further comprising:

third selecting means for selecting an upper case ASCII addressing code mode and a lower case ASCII addressing code mode;

wherein said storing means comprises first storing means including a plurality of storage units for storing upper case ASCII addressing codes and second storing means including a plurality of storage units for storing lower case ASCII addressing codes;

wherein each of said plurality of selecting units identifies one of said upper case ASCII addressing codes stored in said first storing means in response to selection of said upper case ASCII addressing code mode; and wherein each of said plurality of selecting units identifies one of said lower case ASCII addressing codes stored in said second storing means in response to selection of said lower case ASCII addressing code mode.

8. The facsimile machine of claim 7, wherein:

said third selecting means includes a shift key;

said plurality of selecting units includes a set of conventional facsimile quick dial keys adapted for selecting ASCII addressing codes; and said plurality of selecting units includes a set of conventional facsimile numeric keys adapted for selecting ASCII addressing codes.

9. The facsimile machine of claim 5, wherein:

said buffering means includes a plurality of buffering units; and said transmitting means in response to a selection made with one of said selecting units transmits an ASCII addressing code stored in one of said storage units to one of said buffering units.

10. The facsimile machine of claim 9, further comprising:

second selecting means for selecting indication of completion of ASCII addressing code selection; and second generating means for generating a selection completion signal in response to selecting indication of completion of ASCII addressing code selection;

wherein said completion signal is transmitted to said sending means and said sending means sends all ASCII addressing codes in said plurality of buffering units to said digital network in response to said selection completion signal.

11. The facsimile machine of claim 10, wherein:

said second selecting means includes a selection completion key;

said plurality of selecting units includes a set of conventional facsimile quick dial keys adapted for selecting ASCII addressing codes; and said plurality of selecting units includes a set of conventional facsimile numeric keys adapted for selecting ASCII addressing codes.

12. A facsimile machine for transmitting and receiving data over a digital network and/or an analog telephone network, comprising:

first selecting means for selecting ASCII addressing codes for addressing said digital network, and for selecting numeric addressing codes for addressing said analog telephone network;

second selecting means for selecting a digital mode or an analog mode; and first generating means for generating said ASCII addressing codes in response to selection of said digital mode and selections made with said first selecting means, and for generating said numeric addressing codes in response to selection of said analog mode and selections made with said first selecting means.

13. The facsimile machine of claim 12, further comprising:

means for sending said generated ASCII addressing codes to said digital network, and for providing said generated numeric addressing codes to said analog telephone network.

14. The facsimile machine of claim 13, further comprising:

means for generating data;

means for transmitting said data to said digital network when said digital mode has been selected; and means for transmitting said data to said analog network when said analog mode has been selected.

15. The facsimile machine of claim 14, further comprising:

means for receiving data from said digital network;

means for receiving data from said analog network;

means for decoding said data received from said digital network and said analog network.

16. The facsimile machine of claim 13, wherein said first generating means comprises:

ASCII addressing code storing means for storing said ASCII addressing codes, wherein said first selecting means identifies said ASCII addressing codes stored in said ASCII addressing code storing means in response to selection of said digital mode; and numeric addressing code storing means for storing said numeric addressing codes, wherein said first selecting means identifies said numeric addressing codes stored in said numeric addressing code storing means in response to selection of said analog mode.

17. The facsimile machine of claim 16, further comprising:

ASCII addressing code buffering means for buffering said ASCII addressing codes selected from said ASCII addressing code storing means;

numeric addressing code buffering means for buffering said numeric addressing codes selected from said numeric addressing code storing means; and means for transmitting ASCII addressing codes from said ASCII addressing code storing means to said ASCII addressing code buffering means in response to selection of said digital mode and selections made with said first selecting means, and for transmitting numeric addressing codes from said numeric addressing code storing means to said numeric addressing code buffering means in response to selection of said analog mode and selections made with said selecting means.

18. The facsimile machine of claim 17, wherein:

said first selecting means includes a plurality of selecting units;

said ASCII addressing code storing means includes a plurality of ASCII addressing code storage units;

said numeric addressing code storing means includes a plurality of numeric addressing code storage units;

each of said selecting units in response to selection of said digital mode identifies a specific ASCII addressing code stored in one of said ASCII addressing storage units; and each of said selecting units in response to selection of said analog mode identifies a specific numeric addressing code stored in one of said storage units.

19. The facsimile machine of claim 18, wherein:

said plurality of selecting units includes a set of conventional quick dial keys adapted for selecting ASCII addressing codes;

each of said quick dial keys in response to selection of said digital mode identifies a specific ASCII addressing code stored in one of said ASCII addressing code storage units; and each of said quick dial keys in response to selection of said analog mode identifies a specific numeric addressing code stored in one of said numeric addressing code storage units.

20. The facsimile machine of claim 19, wherein:

said plurality of selecting units includes a set of numeric keys;

each of said numeric keys in response to selection of said digital mode identifies a specific ASCII addressing code stored in one of said ASCII addressing code storage units; and each of said numeric keys in response to selection of said analog mode identifies specific numeric addressing code stored in one of said numeric addressing code storage units.

21. The facsimile machine of claim 20, wherein:

said ASCII addressing code buffering means includes a plurality of ASCII addressing code buffering units;

said numeric addressing code buffering means includes a plurality of numeric addressing code buffering units;

said transmitting means in response to selection of said digital mode and a selection made with one of said selecting units transmits an ASCII addressing code stored in one of said ASCII addressing code storage units to one of said ASCII addressing code buffering units; and said transmitting means in response to selection of said analog mode and a selection made with one of said selecting unit transmits a numeric addressing code stored in one of said numeric addressing code storage units to one of said numeric addressing code buffering units.

22. The facsimile machine of claim 21, further comprising:

fourth selecting means for selecting an upper case ASCII addressing code mode and a lower case ASCII addressing code mode;

wherein said ASCII addressing code storing means comprises first storing means including a plurality of storage units for storing upper case ASCII addressing codes and second storing means including a plurality of storage units for storing lower case ASCII addressing codes;

wherein each of said plurality of selecting units identifies one of said upper case ASCII addressing codes stored in said first storing means in response to selection of said upper case ASCII addressing code mode; and wherein each of said plurality of selecting units identifies one of said lower case ASCII addressing codes stored in said second storing means in response to selection of said lower case ASCII addressing code mode.

23. The facsimile machine of claim 21, further comprising:

third selecting means for selecting indication of completion of ASCII addressing code selection; and second generating means for generating a selection completion signal in response to selecting indication of completion of ASCII addressing code selection;

wherein said completion signal is transmitted to said sending means and said sending means sends all ASCII addressing codes in said plurality of ASCII addressing code buffering units to said digital network in response to said selection completion signal.

24. The facsimile machine of claim 23, wherein:

said second selecting means includes a digital mode key and analog mode key;

said third selecting means includes a selection completion key;

said plurality of selecting units includes a set of conventional facsimile quick dial keys adapted for selecting ASCII addressing codes;

each of said quick dial keys in response to selection of said digital mode identifies a specific ASCII addressing code stored in one of said ASCII addressing code storage units;

each of said quick dial keys in response to selection of said analog mode identifies a specific numeric addressing code stored in one of said numeric addressing code storage units;

said plurality of selecting units includes a set of conventional facsimile numeric keys adapted for selecting ASCII addressing codes;

each of said numeric keys in response to selection of said digital mode identifies a specific ASCII addressing code stored in one of said ASCII addressing code storage units; and each of said numeric keys in response to selection of said analog mode identifies specific numeric addressing code stored in one of said numeric addressing code storage units.

25. The facsimile machine of claim 23, wherein:

said second selecting means includes a digital mode key and an analog mode key;

said fourth selecting means includes a shift key;

said plurality of selecting units includes a set of conventional facsimile quick dial keys adapted for selecting ASCII addressing codes;

each of said quick dial keys in response to selection of said digital mode identifies a specific ASCII addressing code stored in one of said ASCII addressing code storage units;

each of said quick dial keys in response to selection of said analog mode identifies a specific numeric addressing code stored in one of said numeric addressing code storage units;

said plurality of selecting units includes a set of conventional facsimile numeric keys;

each of said numeric keys in response to selection of said digital mode identifies a specific ASCII addressing code stored in one of said ASCII addressing code storage units; and each of said numeric keys in response to selection of said analog mode identifies specific numeric addressing code stored in one of said numeric addressing code storage units.

26. A method for use with a facsimile machine for transmitting and receiving data over a digital network and/or an analog telephone network, comprising the steps of:
   selecting a digital mode;
   selecting ASCII addressing codes for addressing said digital network in response to selection of said digital mode;
   generating said ASCII addressing codes in response to selections made in said step of selecting ASCII addressing codes;
   selecting an analog mode;
   selecting numeric addressing codes for addressing said analog telephone network in response to selection of said analog mode; and
   generating said numeric addressing codes in response to selections made in said step of selecting numeric addressing codes.

27. The method of claim 26, further comprising the steps of:
   sending said generated ASCII addressing codes to said digital network; and
   providing said generated numeric addressing codes to said analog telephone network.

28. The method of claim 27, wherein:
   said steps of selecting said ASCII and numeric addressing codes include selecting said ASCII and numeric addressing codes with conventional facsimile quick dial keys and conventional facsimile numeric keys adapted for enabling selection of both ASCII addressing codes and numeric addressing codes.

29. The method of claim 27, further comprising the steps of:
   generating data;
   transmitting said data to said digital network when said digital mode has been selected; and
   transmitting said data to said analog network when said analog mode has been selected.

30. The method of claim 29, further comprising the steps of:
   receiving data from said digital network;
   receiving data from said analog network;
   decoding said data received from said digital network and said analog network.

31. A method for use of with a facsimile machine for transmitting and receiving data over a digital network, comprising the steps of:
   selecting ASCII addressing codes for addressing a second facsimile machine coupled to said digital network; and
   generating said ASCII addressing codes in response to selections made in said selecting step.

32. The method of claim 31, further comprising the steps of:
   sending said ASCII addressing codes generated in said generating step to said digital network.

33. The method of claim 32, wherein said selecting step comprises the step of:
   selecting said ASCII addressing codes with conventional facsimile quick dial keys and conventional facsimile numeric keys adapted for selecting ASCII addressing codes.

* * * * *